(12) United States Patent
Weider et al.

(10) Patent No.: US 8,849,652 B2
(45) Date of Patent: *Sep. 30, 2014

(54) MOBILE SYSTEMS AND METHODS OF SUPPORTING NATURAL LANGUAGE HUMAN-MACHINE INTERACTIONS

(71) Applicant: VoiceBox Technologies Corporation, Bellevue, WA (US)

(72) Inventors: Chris Weider, Everett, WA (US); Richard Kennewick, Woodinville, WA (US); Mike Kennewick, Bellevue, WA (US); Philippe Di Cristo, Bellevue, WA (US); Robert A. Kennewick, Seattle, WA (US); Samuel Menaker, Bellevue, WA (US); Lynn Elise Armstrong, Woodinville, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,045

(22) Filed: May 20, 2013

(65) Prior Publication Data

US 2013/0253929 A1 Sep. 26, 2013

Related U.S. Application Data

(60) Continuation of application No. 13/488,299, filed on Jun. 4, 2012, now Pat. No. 8,447,607, which is a continuation of application No. 13/084,197, filed on Apr. 11, 2011, now Pat. No. 8,195,468, which is a division of application No. 11/212,693, filed on Aug. 29, 2005, now Pat. No. 7,949,529.

(51) Int. Cl.
*G10L 25/00* (2013.01)
*G10L 21/00* (2013.01)
*G06F 17/27* (2006.01)
*G10L 15/22* (2006.01)
*G10L 21/06* (2013.01)
*G06F 17/30* (2006.01)

(52) U.S. Cl.
CPC ............. *G10L 21/06* (2013.01); *G10L 15/22* (2013.01); *H04M 2250/74* (2013.01); *G06F 17/30864* (2013.01)
USPC ............. 704/9; 704/270; 704/270.1; 704/275

(58) Field of Classification Search
CPC .......... G10L 15/19; G10L 15/22; G10L 15/18
USPC .............................................. 704/9, 270–275
See application file for complete search history.

(56) References Cited

U.S. PATENT DOCUMENTS

| 4,430,669 A | 2/1984 | Cheung | 358/122 |
| 4,821,027 A | 4/1989 | Mallory et al. | 340/521 |

(Continued)

FOREIGN PATENT DOCUMENTS

| EP | 1 320 043 A2 | 6/2003 |
| EP | 1 646 037 | 4/2006 |

(Continued)

OTHER PUBLICATIONS

Reuters, "IBM to Enable Honda Drivers to Talk to Cars", Charles Schwab & Co., Inc., Jul. 28, 2002, 1 page.

(Continued)

*Primary Examiner* — Eric Yen
(74) *Attorney, Agent, or Firm* — Pillsbury Winthrop Shaw Pittman LLP

(57) ABSTRACT

A mobile system is provided that includes speech-based and non-speech-based interfaces for telematics applications. The mobile system identifies and uses context, prior information, domain knowledge, and user specific profile data to achieve a natural environment for users that submit requests and/or commands in multiple domains. The invention creates, stores and uses extensive personal profile information for each user, thereby improving the reliability of determining the context and presenting the expected results for a particular question or command. The invention may organize domain specific behavior and information into agents, that are distributable or updateable over a wide area network.

27 Claims, 8 Drawing Sheets

(56) References Cited

U.S. PATENT DOCUMENTS

| | | | | |
|---|---|---|---|---|
| 4,829,423 | A * | 5/1989 | Tennant et al. | 704/8 |
| 4,910,784 | A | 3/1990 | Doddington et al. | 381/43 |
| 5,027,406 | A | 6/1991 | Roberts et al. | 381/43 |
| 5,155,743 | A | 10/1992 | Jacobs | 375/28 |
| 5,164,904 | A | 11/1992 | Sumner | 364/436 |
| 5,208,748 | A | 5/1993 | Flores et al. | 364/419 |
| 5,274,560 | A | 12/1993 | LaRue | 364/444 |
| 5,357,596 | A | 10/1994 | Takebayashi et al. | 395/2.84 |
| 5,377,350 | A | 12/1994 | Skinner | 395/600 |
| 5,386,556 | A | 1/1995 | Hedin et al. | 395/600 |
| 5,424,947 | A | 6/1995 | Nagao et al. | 364/419.08 |
| 5,471,318 | A | 11/1995 | Ahuja et al. | 358/400 |
| 5,475,733 | A | 12/1995 | Eisdorfer et al. | 379/52 |
| 5,488,652 | A | 1/1996 | Bielby et al. | 379/88 |
| 5,499,289 | A | 3/1996 | Bruno et al. | 379/220 |
| 5,500,920 | A | 3/1996 | Kupiec | 395/2.79 |
| 5,517,560 | A | 5/1996 | Greenspan | 379/114 |
| 5,533,108 | A | 7/1996 | Harris et al. | 379/201 |
| 5,537,436 | A | 7/1996 | Bottoms et al. | 375/222 |
| 5,539,744 | A | 7/1996 | Chu et al. | 370/60 |
| 5,557,667 | A | 9/1996 | Bruno et al. | 379/201 |
| 5,559,864 | A | 9/1996 | Kennedy, Jr. | 379/59 |
| 5,563,937 | A | 10/1996 | Bruno et al. | 379/201 |
| 5,577,165 | A | 11/1996 | Takebayashi et al. | 395/2.84 |
| 5,590,039 | A | 12/1996 | Ikeda et al. | 395/759 |
| 5,608,635 | A | 3/1997 | Tamai | 364/449.3 |
| 5,617,407 | A | 4/1997 | Bareis | 369/275.3 |
| 5,633,922 | A | 5/1997 | August et al. | 379/220 |
| 5,652,570 | A | 7/1997 | Lepkofker | 340/573 |
| 5,675,629 | A | 10/1997 | Raffel et al. | 379/58 |
| 5,696,965 | A | 12/1997 | Dedrick | 395/610 |
| 5,708,422 | A | 1/1998 | Blonder et al. | 340/825.34 |
| 5,721,938 | A | 2/1998 | Stuckey | 395/754 |
| 5,722,084 | A | 2/1998 | Chakrin et al. | 455/551 |
| 5,740,256 | A | 4/1998 | Castello Da Costa et al. | 361/94.7 |
| 5,742,763 | A | 4/1998 | Jones | 395/200.3 |
| 5,748,841 | A | 5/1998 | Morin et al. | 395/2.66 |
| 5,748,974 | A | 5/1998 | Johnson | 395/759 |
| 5,752,052 | A | 5/1998 | Richardson et al. | 395/759 |
| 5,754,784 | A | 5/1998 | Garland et al. | 395/200.49 |
| 5,761,631 | A | 6/1998 | Nasukawa | 704/9 |
| 5,774,841 | A | 6/1998 | Salazar et al. | 704/225 |
| 5,774,859 | A | 6/1998 | Houser et al. | 704/275 |
| 5,794,050 | A | 8/1998 | Dahlgren et al. | 395/708 |
| 5,794,196 | A | 8/1998 | Yegnanarayanan et al. | 704/255 |
| 5,797,112 | A | 8/1998 | Komatsu et al. | 701/201 |
| 5,799,276 | A | 8/1998 | Komissarchik et al. | 704/251 |
| 5,802,510 | A | 9/1998 | Jones | 707/2 |
| 5,832,221 | A | 11/1998 | Jones | 375/200.36 |
| 5,839,107 | A | 11/1998 | Gupta et al. | 704/270 |
| 5,848,396 | A | 12/1998 | Gerace | 705/10 |
| 5,855,000 | A | 12/1998 | Waibel et al. | 704/235 |
| 5,867,817 | A | 2/1999 | Catallo et al. | 704/255 |
| 5,878,385 | A | 3/1999 | Bralich et al. | 704/9 |
| 5,878,386 | A | 3/1999 | Coughlin | 704/10 |
| 5,892,813 | A | 4/1999 | Morin et al. | 379/88.01 |
| 5,892,900 | A | 4/1999 | Ginter et al. | 395/186 |
| 5,895,464 | A | 4/1999 | Bhandari et al. | 707/3 |
| 5,895,466 | A | 4/1999 | Goldberg et al. | 707/5 |
| 5,897,613 | A | 4/1999 | Chan | 704/210 |
| 5,902,347 | A | 5/1999 | Backman et al. | 701/200 |
| 5,911,120 | A | 6/1999 | Jarett et al. | 455/417 |
| 5,918,222 | A | 6/1999 | Fukui et al. | 707/1 |
| 5,926,784 | A | 7/1999 | Richardson et al. | 704/9 |
| 5,933,822 | A | 8/1999 | Braden-Harder et al. | 707/5 |
| 5,950,167 | A * | 9/1999 | Yaker | 704/275 |
| 5,953,393 | A | 9/1999 | Culbreth et al. | 379/88.25 |
| 5,960,397 | A | 9/1999 | Rahim | 704/244 |
| 5,960,399 | A | 9/1999 | Barclay et al. | 704/270 |
| 5,960,447 | A | 9/1999 | Holt et al. | 707/500 |
| 5,963,894 | A | 10/1999 | Richardson et al. | 704/9 |
| 5,963,940 | A | 10/1999 | Liddy et al. | 707/5 |
| 5,987,404 | A | 11/1999 | Della Pietra et al. | 704/9 |
| 5,991,721 | A | 11/1999 | Asano et al. | 704/257 |
| 5,995,119 | A | 11/1999 | Cosatto et al. | 345/473 |
| 5,995,928 | A | 11/1999 | Nguyen et al. | 704/251 |
| 6,009,382 | A | 12/1999 | Martino et al. | 704/1 |
| 6,014,559 | A | 1/2000 | Amin | 455/413 |
| 6,018,708 | A | 1/2000 | Dahan et al. | 704/244 |
| 6,021,384 | A | 2/2000 | Gorin et al. | 704/1 |
| 6,028,514 | A | 2/2000 | Lemelson et al. | 340/539 |
| 6,035,267 | A | 3/2000 | Watanabe et al. | 704/1 |
| 6,044,347 | A | 3/2000 | Abella et al. | 704/272 |
| 6,049,602 | A | 4/2000 | Foladare et al. | 379/265 |
| 6,049,607 | A | 4/2000 | Marash et al. | 379/410 |
| 6,058,187 | A | 5/2000 | Chen | 380/21 |
| 6,067,513 | A | 5/2000 | Ishimitsu | 704/233 |
| 6,076,059 | A | 6/2000 | Glickman et al. | 704/260 |
| 6,078,886 | A | 6/2000 | Dragosh et al. | 704/270 |
| 6,081,774 | A | 6/2000 | De Hita et al. | 704/9 |
| 6,085,186 | A | 7/2000 | Christianson et al. | 707/3 |
| 6,101,241 | A | 8/2000 | Boyce et al. | 379/88.01 |
| 6,108,631 | A | 8/2000 | Ruhl | 704/270 |
| 6,119,087 | A | 9/2000 | Kuhn et al. | 704/270 |
| 6,122,613 | A | 9/2000 | Baker | 704/235 |
| 6,134,235 | A | 10/2000 | Goldman et al. | 370/352 |
| 6,144,667 | A | 11/2000 | Doshi et al. | 370/401 |
| 6,144,938 | A | 11/2000 | Surace et al. | 704/257 |
| 6,154,526 | A | 11/2000 | Dahlke et al. | 379/88.03 |
| 6,160,883 | A | 12/2000 | Jackson et al. | 379/230 |
| 6,167,377 | A | 12/2000 | Gillick et al. | 704/240 |
| 6,173,266 | B1 | 1/2001 | Marx et al. | 704/270 |
| 6,173,279 | B1 | 1/2001 | Levin et al. | 707/5 |
| 6,175,858 | B1 | 1/2001 | Bulfer et al. | 709/206 |
| 6,185,535 | B1 | 2/2001 | Hedin et al. | 704/270 |
| 6,188,982 | B1 | 2/2001 | Chiang | 704/256 |
| 6,192,110 | B1 | 2/2001 | Abella et al. | 379/88.01 |
| 6,192,338 | B1 | 2/2001 | Haszto et al. | 704/257 |
| 6,195,634 | B1 | 2/2001 | Dudemaine et al. | 704/231 |
| 6,195,651 | B1 | 2/2001 | Handel et al. | 707/2 |
| 6,199,043 | B1 | 3/2001 | Happ | 704/272 |
| 6,208,964 | B1 | 3/2001 | Sabourin | 704/244 |
| 6,208,972 | B1 | 3/2001 | Grant et al. | 704/275 |
| 6,219,346 | B1 | 4/2001 | Maxemchuk | 370/338 |
| 6,219,643 | B1 | 4/2001 | Cohen et al. | 704/257 |
| 6,226,612 | B1 | 5/2001 | Srenger et al. | 704/256 |
| 6,233,556 | B1 | 5/2001 | Teunen et al. | 704/250 |
| 6,233,559 | B1 | 5/2001 | Balakrishnan | 704/275 |
| 6,233,561 | B1 | 5/2001 | Junqua et al. | 704/277 |
| 6,236,968 | B1 | 5/2001 | Kanevsky et al. | 704/275 |
| 6,246,981 | B1 | 6/2001 | Papineni et al. | 704/235 |
| 6,246,990 | B1 | 6/2001 | Happ | 704/275 |
| 6,266,636 | B1 | 7/2001 | Kosaka et al. | 704/244 |
| 6,269,336 | B1 | 7/2001 | Ladd et al. | 704/270 |
| 6,272,455 | B1 | 8/2001 | Hoshen et al. | 704/1 |
| 6,275,231 | B1 | 8/2001 | Obradovich | 345/349 |
| 6,278,377 | B1 | 8/2001 | DeLine et al. | 340/815.4 |
| 6,278,968 | B1 | 8/2001 | Franz et al. | 704/3 |
| 6,288,319 | B1 | 9/2001 | Catona | 84/609 |
| 6,292,767 | B1 | 9/2001 | Jackson et al. | 704/1 |
| 6,301,560 | B1 | 10/2001 | Masters | 704/251 |
| 6,308,151 | B1 | 10/2001 | Smith | 704/235 |
| 6,314,402 | B1 | 11/2001 | Monaco et al. | 704/275 |
| 6,321,196 | B1 | 11/2001 | Franceschi | 704/243 |
| 6,356,869 | B1 | 3/2002 | Chapados et al. | 704/275 |
| 6,362,748 | B1 | 3/2002 | Huang | 340/901 |
| 6,366,882 | B1 | 4/2002 | Bijl et al. | 704/235 |
| 6,366,886 | B1 | 4/2002 | Dragosh et al. | 704/270.1 |
| 6,374,214 | B1 | 4/2002 | Friedland et al. | 704/235 |
| 6,377,913 | B1 | 4/2002 | Coffman et al. | 704/8 |
| 6,381,535 | B1 | 4/2002 | Durocher et al. | 701/202 |
| 6,385,596 | B1 | 5/2002 | Wiser et al. | 705/51 |
| 6,385,646 | B1 | 5/2002 | Brown et al. | 709/217 |
| 6,393,403 | B1 | 5/2002 | Majaniemi | 704/275 |
| 6,393,428 | B1 | 5/2002 | Miller et al. | 707/102 |
| 6,397,181 | B1 | 5/2002 | Li et al. | 704/256 |
| 6,404,878 | B1 | 6/2002 | Jackson et al. | 379/221.01 |
| 6,405,170 | B1 | 6/2002 | Phillips et al. | 704/270 |
| 6,408,272 | B1 | 6/2002 | White et al. | 704/270.1 |
| 6,411,810 | B1 | 6/2002 | Maxemchuk | 455/453 |
| 6,411,893 | B2 | 6/2002 | Ruhl | 701/207 |
| 6,415,257 | B1 | 7/2002 | Junqua et al. | 704/275 |
| 6,418,210 | B1 | 7/2002 | Sayko | 379/142.15 |

(56) References Cited

U.S. PATENT DOCUMENTS

| | | |
|---|---|---|
| 6,420,975 B1 | 7/2002 | DeLine et al. ............... 340/815.4 |
| 6,429,813 B2 | 8/2002 | Feigen ..................... 342/357.13 |
| 6,430,285 B1 | 8/2002 | Bauer et al. ............... 379/265.01 |
| 6,430,531 B1 | 8/2002 | Polish ......................... 704/257 |
| 6,434,523 B1 | 8/2002 | Monaco ....................... 704/257 |
| 6,434,524 B1 | 8/2002 | Weber .......................... 704/257 |
| 6,434,529 B1 | 8/2002 | Walker et al. ................ 704/275 |
| 6,442,522 B1 | 8/2002 | Carberry et al. .............. 704/257 |
| 6,446,114 B1 | 9/2002 | Bulfer et al. ................. 709/206 |
| 6,453,153 B1 | 9/2002 | Bowker et al. ............... 455/67.4 |
| 6,453,292 B2 | 9/2002 | Ramaswamy et al. ........ 704/235 |
| 6,456,711 B1 | 9/2002 | Cheung et al. ........... 379/265.09 |
| 6,456,974 B1 | 9/2002 | Baker et al. ................ 704/270.1 |
| 6,466,654 B1 | 10/2002 | Cooper et al. ............. 379/88.01 |
| 6,466,899 B1 | 10/2002 | Yano et al. ...................... 704/1 |
| 6,470,315 B1 | 10/2002 | Netsch et al. ................. 704/256 |
| 6,487,494 B2 | 11/2002 | Odinak et al. ................ 701/202 |
| 6,487,495 B1 | 11/2002 | Gale et al. .................... 701/209 |
| 6,498,797 B1 | 12/2002 | Anerousis et al. ............ 370/522 |
| 6,499,013 B1 | 12/2002 | Weber .......................... 704/257 |
| 6,501,833 B2 | 12/2002 | Phillips et al. ............. 379/88.07 |
| 6,501,834 B1 | 12/2002 | Milewski et al. ........... 379/93.24 |
| 6,505,155 B1 | 1/2003 | Vanbuskirk et al. .......... 704/246 |
| 6,510,417 B1 | 1/2003 | Woods et al. ................. 704/275 |
| 6,513,006 B2 | 1/2003 | Howard et al. ............... 704/257 |
| 6,522,746 B1 | 2/2003 | Marchok et al. ......... 379/406.03 |
| 6,523,061 B1 | 2/2003 | Halverson et al. ............ 709/202 |
| 6,532,444 B1 | 3/2003 | Weber .......................... 704/257 |
| 6,539,348 B1 | 3/2003 | Bond et al. ...................... 704/9 |
| 6,549,629 B2 | 4/2003 | Finn et al. ....................... 381/92 |
| 6,553,372 B1 | 4/2003 | Brassell et al. ................... 707/5 |
| 6,556,970 B1 | 4/2003 | Sasaki et al. .................. 704/257 |
| 6,556,973 B1 | 4/2003 | Lewin ........................... 704/277 |
| 6,560,576 B1 | 5/2003 | Cohen et al. .................. 704/270 |
| 6,560,590 B1 | 5/2003 | Shwe et al. ..................... 706/55 |
| 6,567,778 B1 | 5/2003 | Chao Chang et al. ......... 704/257 |
| 6,567,797 B1 | 5/2003 | Schuetze et al. .................. 707/2 |
| 6,570,555 B1 | 5/2003 | Prevost et al. ................. 345/156 |
| 6,570,964 B1 | 5/2003 | Murveit et al. ............... 379/67.1 |
| 6,571,279 B1 | 5/2003 | Herz et al. .................... 709/217 |
| 6,574,597 B1 | 6/2003 | Mohri et al. .................. 704/251 |
| 6,574,624 B1 | 6/2003 | Johnson et al. .................. 707/5 |
| 6,578,022 B1 | 6/2003 | Foulger et al. .................. 706/45 |
| 6,581,103 B1 | 6/2003 | Dengler ........................ 709/231 |
| 6,584,439 B1 | 6/2003 | Geilhufe et al. .............. 704/270 |
| 6,587,858 B1 | 7/2003 | Strazza ......................... 707/102 |
| 6,591,239 B1 | 7/2003 | McCall et al. ................ 704/275 |
| 6,594,257 B1 | 7/2003 | Doshi et al. .................. 370/352 |
| 6,594,367 B1 | 7/2003 | Marash et al. .................. 381/92 |
| 6,598,018 B1 | 7/2003 | Junqua ......................... 704/251 |
| 6,601,026 B2 | 7/2003 | Appelt et al. ..................... 704/9 |
| 6,604,075 B1 | 8/2003 | Brown et al. ............... 704/270.1 |
| 6,604,077 B2 | 8/2003 | Dragosh et al. ............ 704/270.1 |
| 6,606,598 B1 | 8/2003 | Holthouse et al. ............ 704/275 |
| 6,611,692 B2 | 8/2003 | Raffel et al. .................. 455/552 |
| 6,614,773 B1 | 9/2003 | Maxemchuk .................. 370/337 |
| 6,615,172 B1 | 9/2003 | Bennett et al. ................ 704/257 |
| 6,622,119 B1 | 9/2003 | Ramaswamy et al. ............ 704/9 |
| 6,629,066 B1 | 9/2003 | Jackson et al. ................... 704/9 |
| 6,631,346 B1 | 10/2003 | Karaorman et al. .............. 704/9 |
| 6,631,351 B1 | 10/2003 | Ramachandran et al. .... 704/270 |
| 6,633,846 B1 | 10/2003 | Bennett et al. ................ 704/257 |
| 6,636,790 B1 | 10/2003 | Lightner et al. ................ 701/33 |
| 6,643,620 B1 | 11/2003 | Contolini et al. ............. 704/275 |
| 6,650,747 B1 | 11/2003 | Bala et al. ................. 379/265.06 |
| 6,658,388 B1 | 12/2003 | Kleindienst et al. .......... 704/275 |
| 6,678,680 B1 | 1/2004 | Woo ................................ 707/6 |
| 6,681,206 B1 | 1/2004 | Gorin et al. ................... 704/243 |
| 6,691,151 B1 | 2/2004 | Cheyer et al. ................. 709/202 |
| 6,701,294 B1 | 3/2004 | Ball et al. ...................... 704/257 |
| 6,704,396 B2 | 3/2004 | Parolkar et al. ............. 379/88.17 |
| 6,704,576 B1 | 3/2004 | Brachman et al. ............. 455/503 |
| 6,704,708 B1 | 3/2004 | Pickering ...................... 704/235 |
| 6,707,421 B1 | 3/2004 | Drury et al. .................. 342/357.1 |
| 6,708,150 B1 | 3/2004 | Hirayama et al. ............. 704/243 |
| 6,721,001 B1 | 4/2004 | Berstis ....................... 348/231.3 |
| 6,721,633 B2 | 4/2004 | Funk et al. ......................... 701/1 |
| 6,721,706 B1 | 4/2004 | Strubbe et al. ................ 704/275 |
| 6,726,636 B2 | 4/2004 | Der Ghazarian et al. ...... 600/532 |
| 6,735,592 B1 | 5/2004 | Neumann et al. ............. 707/101 |
| 6,739,556 B1 | 5/2004 | Langston ....................... 244/189 |
| 6,741,931 B1 | 5/2004 | Kohut et al. ................... 701/209 |
| 6,742,021 B1 | 5/2004 | Halverson et al. ............ 709/218 |
| 6,745,161 B1 | 6/2004 | Arnold et al. ..................... 704/7 |
| 6,751,591 B1 | 6/2004 | Gorin et al. ................... 704/257 |
| 6,751,612 B1 | 6/2004 | Schuetze et al. .................. 707/4 |
| 6,754,485 B1 | 6/2004 | Obradovich et al. ........ 455/414.1 |
| 6,754,627 B2 | 6/2004 | Woodward .................... 704/235 |
| 6,757,544 B2 | 6/2004 | Rangarajan et al. ........ 455/456.1 |
| 6,757,718 B1 | 6/2004 | Halverson et al. ............ 709/218 |
| 6,795,808 B1 | 9/2004 | Strubbe et al. ................ 704/275 |
| 6,801,604 B2 | 10/2004 | Maes et al. ................. 379/88.17 |
| 6,801,893 B1 | 10/2004 | Backfried et al. ............. 704/257 |
| 6,813,341 B1 | 11/2004 | Mahoney .................... 379/88.01 |
| 6,829,603 B1 | 12/2004 | Chai et al. ......................... 707/5 |
| 6,832,230 B1 | 12/2004 | Zilliacus et al. ............... 707/203 |
| 6,833,848 B1 | 12/2004 | Wolff et al. ................... 345/719 |
| 6,850,603 B1 | 2/2005 | Eberle et al. ................ 379/88.16 |
| 6,856,990 B2 | 2/2005 | Barile et al. ..................... 707/10 |
| 6,865,481 B2 | 3/2005 | Kawazoe et al. .............. 701/211 |
| 6,868,380 B2 | 3/2005 | Kroeker ........................ 704/240 |
| 6,868,385 B1 | 3/2005 | Gerson .......................... 704/275 |
| 6,873,837 B1 | 3/2005 | Yoshioka et al. .............. 455/321 |
| 6,877,001 B2 | 4/2005 | Wolf et al. ......................... 707/3 |
| 6,877,134 B1 | 4/2005 | Fuller et al. ................. 715/500.1 |
| 6,901,366 B1 | 5/2005 | Kuhn et al. .................... 704/275 |
| 6,910,003 B1 | 6/2005 | Arnold et al. ..................... 704/4 |
| 6,912,498 B2 | 6/2005 | Stevens et al. ................ 704/235 |
| 6,915,126 B2 | 7/2005 | Mazzara, Jr. .................. 455/411 |
| 6,928,614 B1 | 8/2005 | Everhart ........................ 715/728 |
| 6,934,756 B2 | 8/2005 | Maes ............................. 709/227 |
| 6,937,977 B2 | 8/2005 | Gerson .......................... 704/201 |
| 6,937,982 B2 | 8/2005 | Kitaoka et al. ................ 704/252 |
| 6,944,594 B2 | 9/2005 | Busayapongchai et al. ... 704/275 |
| 6,950,821 B2 | 9/2005 | Faybishenko et al. .......... 707/10 |
| 6,954,755 B2 | 10/2005 | Reisman .......................... 707/10 |
| 6,959,276 B2 | 10/2005 | Droppo et al. ................. 704/226 |
| 6,961,700 B2 | 11/2005 | Mitchell et al. ............... 704/235 |
| 6,963,759 B1 | 11/2005 | Gerson .......................... 455/563 |
| 6,964,023 B2 * | 11/2005 | Maes et al. .................... 715/811 |
| 6,968,311 B2 | 11/2005 | Knockeart et al. ............ 704/270 |
| 6,973,387 B2 | 12/2005 | Masclet et al. ................ 701/211 |
| 6,975,993 B1 | 12/2005 | Keiller .......................... 704/270 |
| 6,980,092 B2 | 12/2005 | Turnbull et al. ............. 340/425.5 |
| 6,983,055 B2 | 1/2006 | Luo ............................... 381/313 |
| 6,990,513 B2 | 1/2006 | Belfiore et al. ................ 709/203 |
| 6,996,531 B2 | 2/2006 | Korall et al. ................... 704/270 |
| 7,003,463 B1 * | 2/2006 | Maes et al. ................. 704/270.1 |
| 7,016,849 B2 | 3/2006 | Arnold et al. ................. 704/275 |
| 7,020,609 B2 | 3/2006 | Thrift et al. ................. 704/270.1 |
| 7,024,364 B2 | 4/2006 | Guerra et al. .................. 704/270 |
| 7,027,586 B2 | 4/2006 | Bushey et al. ............ 379/265.09 |
| 7,027,975 B1 | 4/2006 | Pazandak et al. .................. 704/9 |
| 7,035,415 B2 | 4/2006 | Belt et al. ......................... 381/92 |
| 7,036,128 B1 | 4/2006 | Julia et al. ..................... 719/317 |
| 7,043,425 B2 | 5/2006 | Pao ............................... 704/211 |
| 7,054,817 B2 | 5/2006 | Shao .............................. 704/270 |
| 7,058,890 B2 | 6/2006 | George et al. ................. 715/728 |
| 7,062,488 B1 | 6/2006 | Reisman ............................ 707/8 |
| 7,069,220 B2 | 6/2006 | Coffman et al. ............... 704/275 |
| 7,072,834 B2 | 7/2006 | Zhou ............................. 704/244 |
| 7,076,362 B2 | 7/2006 | Ohtsuji et al. ................. 701/211 |
| 7,082,469 B2 | 7/2006 | Gold et al. .................... 709/231 |
| 7,085,708 B2 | 8/2006 | Manson ............................ 704/9 |
| 7,092,928 B1 | 8/2006 | Elad et al. ....................... 706/60 |
| 7,107,210 B2 | 9/2006 | Deng et al. .................... 704/226 |
| 7,107,218 B1 | 9/2006 | Preston ......................... 704/270 |
| 7,110,951 B1 | 9/2006 | Lemelson et al. ............. 704/270 |
| 7,127,400 B2 | 10/2006 | Koch ......................... 704/270.1 |
| 7,130,390 B2 | 10/2006 | Abburi ........................ 379/88.17 |
| 7,136,875 B2 | 11/2006 | Anderson et al. .......... 707/104.1 |
| 7,137,126 B1 | 11/2006 | Coffman et al. ............... 719/328 |
| 7,143,037 B1 | 11/2006 | Chestnut ....................... 704/251 |
| 7,143,039 B1 | 11/2006 | Stifelman et al. ............. 704/270 |

(56) References Cited

U.S. PATENT DOCUMENTS

| | | | | |
|---|---|---|---|---|
| 7,146,319 | B2 | 12/2006 | Hunt | 704/254 |
| 7,149,696 | B2 | 12/2006 | Shimizu et al. | 705/1 |
| 7,165,028 | B2 | 1/2007 | Gong | 704/233 |
| 7,170,993 | B2 | 1/2007 | Anderson et al. | 379/265.09 |
| 7,171,291 | B2 | 1/2007 | Obradovich | 701/29 |
| 7,174,300 | B2 | 2/2007 | Bush | 704/275 |
| 7,177,798 | B2 | 2/2007 | Hsu et al. | 704/9 |
| 7,184,957 | B2 | 2/2007 | Brookes et al. | 704/246 |
| 7,190,770 | B2 | 3/2007 | Ando et al. | 379/88.01 |
| 7,197,069 | B2 | 3/2007 | Agazzi et al. | 375/233 |
| 7,197,460 | B1 | 3/2007 | Gupta et al. | 704/270.1 |
| 7,203,644 | B2 | 4/2007 | Anderson et al. | 704/246 |
| 7,206,418 | B2 | 4/2007 | Yang et al. | 381/92 |
| 7,207,011 | B2 | 4/2007 | Mulvey et al. | 715/812 |
| 7,215,941 | B2 | 5/2007 | Beckmann et al. | 455/404.1 |
| 7,228,276 | B2 | 6/2007 | Omote et al. | 704/243 |
| 7,231,343 | B1 | 6/2007 | Treadgold et al. | 704/9 |
| 7,236,923 | B1 | 6/2007 | Gupta | 704/9 |
| 7,254,482 | B2 | 8/2007 | Kawasaki et al. | 701/211 |
| 7,272,212 | B2 | 9/2007 | Eberle et al. | 379/88.17 |
| 7,277,854 | B2 | 10/2007 | Bennett et al. | 704/257 |
| 7,283,829 | B2 | 10/2007 | Christenson et al. | 455/461 |
| 7,283,951 | B2 | 10/2007 | Marchisio et al. | 704/9 |
| 7,289,606 | B2 | 10/2007 | Sibal et al. | 379/52 |
| 7,299,186 | B2 | 11/2007 | Kuzunuki et al. | 704/270.1 |
| 7,301,093 | B2 | 11/2007 | Sater et al. | 84/615 |
| 7,305,381 | B1 | 12/2007 | Poppink et al. | 1/1 |
| 7,321,850 | B2 | 1/2008 | Wakita | 704/10 |
| 7,328,155 | B2 | 2/2008 | Endo et al. | 704/251 |
| 7,337,116 | B2 | 2/2008 | Charlesworth et al. | 704/254 |
| 7,340,040 | B1 | 3/2008 | Saylor et al. | 379/67.1 |
| 7,366,285 | B2 | 4/2008 | Parolkar et al. | 379/88.17 |
| 7,366,669 | B2 | 4/2008 | Nishitani et al. | 704/256 |
| 7,376,645 | B2 | 5/2008 | Bernard | 707/3 |
| 7,386,443 | B1 | 6/2008 | Parthasarathy et al. | 704/201 |
| 7,398,209 | B2 | 7/2008 | Kennewick et al. | 704/255 |
| 7,406,421 | B2 | 7/2008 | Odinak et al. | 704/275 |
| 7,415,414 | B2 | 8/2008 | Azara et al. | 704/270 |
| 7,421,393 | B1 | 9/2008 | Di Fabbrizio et al. | 704/275 |
| 7,424,431 | B2 | 9/2008 | Greene et al. | 704/270 |
| 7,447,635 | B1 | 11/2008 | Konopka et al. | 704/275 |
| 7,451,088 | B1 | 11/2008 | Ehlen et al. | 704/270.1 |
| 7,454,608 | B2 | 11/2008 | Gopalakrishnan et al. | 713/100 |
| 7,461,059 | B2 | 12/2008 | Richardson et al. | 707/5 |
| 7,472,020 | B2 | 12/2008 | Brulle-Drews | 701/211 |
| 7,472,060 | B1 | 12/2008 | Gorin et al. | 704/240 |
| 7,472,075 | B2 | 12/2008 | Odinak et al. | 705/26 |
| 7,477,909 | B2 | 1/2009 | Roth | 455/466 |
| 7,478,036 | B2 | 1/2009 | Shen et al. | 704/9 |
| 7,487,088 | B1 | 2/2009 | Gorin et al. | 704/240 |
| 7,487,110 | B2 | 2/2009 | Bennett et al. | 705/26 |
| 7,493,259 | B2 | 2/2009 | Jones et al. | 704/257 |
| 7,493,559 | B1 | 2/2009 | Wolff et al. | 715/727 |
| 7,502,672 | B1 | 3/2009 | Kolls | 701/29 |
| 7,502,738 | B2 | 3/2009 | Kennewick et al. | 704/257 |
| 7,516,076 | B2 | 4/2009 | Walker et al. | 704/275 |
| 7,529,675 | B2 | 5/2009 | Maes | 704/270.1 |
| 7,536,297 | B2 | 5/2009 | Byrd et al. | 704/10 |
| 7,536,374 | B2 | 5/2009 | Au | 706/55 |
| 7,542,894 | B2 | 6/2009 | Murata | 704/9 |
| 7,546,382 | B2 | 6/2009 | Healey et al. | 709/246 |
| 7,548,491 | B2 | 6/2009 | Macfarlane | 367/198 |
| 7,552,054 | B1 | 6/2009 | Stifelman et al. | 704/270 |
| 7,558,730 | B2 | 7/2009 | Davis et al. | 704/235 |
| 7,574,362 | B2 | 8/2009 | Walker et al. | 704/275 |
| 7,577,244 | B2 | 8/2009 | Taschereau | 379/218.01 |
| 7,606,708 | B2 | 10/2009 | Hwang | 704/257 |
| 7,620,549 | B2 | 11/2009 | Di Cristo et al. | 704/257 |
| 7,634,409 | B2 | 12/2009 | Kennewick et al. | 704/257 |
| 7,640,006 | B2 | 12/2009 | Portman et al. | 455/412.1 |
| 7,640,160 | B2 | 12/2009 | Di Cristo et al. | 704/257 |
| 7,640,272 | B2 | 12/2009 | Mahajan et al. | 707/104.1 |
| 7,676,365 | B2 | 3/2010 | Hwang et al. | 704/240 |
| 7,676,369 | B2 | 3/2010 | Fujimoto et al. | 704/270 |
| 7,684,977 | B2 | 3/2010 | Morikawa | 704/211 |
| 7,693,720 | B2 | 4/2010 | Kennewick et al. | 704/275 |
| 7,729,916 | B2 | 6/2010 | Coffman et al. | 704/270 |
| 7,729,918 | B2 | 6/2010 | Walker et al. | 704/275 |
| 7,729,920 | B2 | 6/2010 | Chaar et al. | 704/275 |
| 7,734,287 | B2 | 6/2010 | Ying | 455/423 |
| 7,748,021 | B2 | 6/2010 | Obradovich | 725/105 |
| 7,788,084 | B2 | 8/2010 | Brun et al. | 704/7 |
| 7,801,731 | B2 | 9/2010 | Odinak et al. | 704/275 |
| 7,809,570 | B2 | 10/2010 | Kennewick et al. | 704/257 |
| 7,818,176 | B2 | 10/2010 | Freeman et al. | 704/270 |
| 7,831,426 | B2 | 11/2010 | Bennett | 704/252 |
| 7,831,433 | B1 | 11/2010 | Belvin et al. | 704/275 |
| 7,856,358 | B2 | 12/2010 | Ho | 704/270 |
| 7,873,519 | B2 | 1/2011 | Bennett | 704/257 |
| 7,873,523 | B2 | 1/2011 | Potter et al. | 704/275 |
| 7,873,654 | B2 | 1/2011 | Bernard | 707/769 |
| 7,881,936 | B2 | 2/2011 | Longé et al. | 704/257 |
| 7,890,324 | B2 | 2/2011 | Bangalore et al. | 704/231 |
| 7,894,849 | B2 | 2/2011 | Kass et al. | 455/550.1 |
| 7,902,969 | B2 | 3/2011 | Obradovich | 340/439 |
| 7,917,367 | B2 | 3/2011 | Di Cristo et al. | 704/270.1 |
| 7,920,682 | B2 | 4/2011 | Byrne et al. | 379/88.18 |
| 7,949,529 | B2 | 5/2011 | Weider et al. | 704/270 |
| 7,949,537 | B2 | 5/2011 | Walker et al. | 704/275 |
| 7,953,732 | B2 | 5/2011 | Frank et al. | 707/724 |
| 7,974,875 | B1 | 7/2011 | Quilici et al. | 705/14.4 |
| 7,983,917 | B2 | 7/2011 | Kennewick et al. | 704/257 |
| 7,984,287 | B2 | 7/2011 | Gopalakrishnan et al. | 713/100 |
| 8,005,683 | B2 | 8/2011 | Tessel et al. | 704/275 |
| 8,015,006 | B2 | 9/2011 | Kennewick et al. | 704/236 |
| 8,060,367 | B2 | 11/2011 | Keaveney | 704/247 |
| 8,069,046 | B2 | 11/2011 | Kennewick et al. | 704/257 |
| 8,073,681 | B2 | 12/2011 | Baldwin et al. | 704/9 |
| 8,077,975 | B2 | 12/2011 | Ma et al. | 382/187 |
| 8,082,153 | B2 | 12/2011 | Coffman et al. | 704/270 |
| 8,086,463 | B2 | 12/2011 | Ativanichayaphong et al. | 704/275 |
| 8,112,275 | B2 | 2/2012 | Kennewick et al. | 704/240 |
| 8,140,327 | B2 | 3/2012 | Kennewick et al. | 704/226 |
| 8,140,335 | B2 | 3/2012 | Kennewick et al. | 704/257 |
| 8,145,489 | B2 | 3/2012 | Freeman et al. | 704/257 |
| 8,150,694 | B2 | 4/2012 | Kennewick et al. | 704/257 |
| 8,155,962 | B2 | 4/2012 | Kennewick et al. | 704/257 |
| 8,170,867 | B2 | 5/2012 | Germain | 704/9 |
| 8,195,468 | B2 | 6/2012 | Weider et al. | 704/275 |
| 8,219,399 | B2 | 7/2012 | Lutz et al. | 704/270 |
| 8,219,599 | B2 | 7/2012 | Tunstall-Pedoe | 707/955 |
| 8,224,652 | B2 | 7/2012 | Wang et al. | 704/275 |
| 8,255,224 | B2 | 8/2012 | Singleton et al. | 704/275 |
| 8,326,627 | B2 | 12/2012 | Kennewick et al. | 704/257 |
| 8,326,634 | B2 | 12/2012 | Di Cristo et al. | 704/270.1 |
| 8,326,637 | B2 | 12/2012 | Baldwin et al. | 704/275 |
| 8,332,224 | B2 | 12/2012 | Di Cristo et al. | 704/257 |
| 8,370,147 | B2 | 2/2013 | Kennewick et al. | 704/257 |
| 8,447,607 | B2 | 5/2013 | Weider et al. | 704/250 |
| 8,452,598 | B2 | 5/2013 | Kennewick et al. | 704/257 |
| 8,509,403 | B2 | 8/2013 | Chiu et al. | 379/114.13 |
| 8,515,765 | B2 | 8/2013 | Baldwin et al. | 704/275 |
| 8,527,274 | B2 | 9/2013 | Freeman et al. | 704/257 |
| 8,589,161 | B2 | 11/2013 | Kennewick et al. | 704/252 |
| 8,620,659 | B2 | 12/2013 | Di Cristo et al. | 704/257 |
| 8,719,009 | B2 | 5/2014 | Baldwin et al. | 704/9 |
| 8,719,026 | B2 | 5/2014 | Kennewick et al. | 704/257 |
| 8,738,380 | B2 | 5/2014 | Baldwin et al. | 704/257 |
| 2001/0041980 | A1 | 11/2001 | Howard et al. | 704/270 |
| 2001/0049601 | A1 | 12/2001 | Kroeker et al. | 704/254 |
| 2001/0054087 | A1 | 12/2001 | Flom et al. | 709/218 |
| 2002/0015500 | A1 | 2/2002 | Belt et al. | 381/66 |
| 2002/0022927 | A1 | 2/2002 | Lemelson et al. | 701/301 |
| 2002/0029261 | A1 | 3/2002 | Shibata | 709/219 |
| 2002/0032752 | A1 | 3/2002 | Gold et al. | 709/218 |
| 2002/0035501 | A1 | 3/2002 | Handel et al. | 705/10 |
| 2002/0040297 | A1* | 4/2002 | Tsiao et al. | 704/257 |
| 2002/0049535 | A1 | 4/2002 | Rigo et al. | 701/211 |
| 2002/0049805 | A1 | 4/2002 | Yamada et al. | 709/202 |
| 2002/0065568 | A1 | 5/2002 | Silfvast et al. | 700/94 |
| 2002/0067839 | A1 | 6/2002 | Heinrich | 381/110 |
| 2002/0069059 | A1 | 6/2002 | Smith | 704/257 |
| 2002/0069071 | A1 | 6/2002 | Knockeart et al. | 704/275 |

(56) References Cited

U.S. PATENT DOCUMENTS

| | | | |
|---|---|---|---|
| 2002/0082911 A1 | 6/2002 | Dunn et al. | 705/14 |
| 2002/0087326 A1 | 7/2002 | Lee et al. | 704/270.1 |
| 2002/0087525 A1 | 7/2002 | Abbott et al. | 707/3 |
| 2002/0107694 A1 | 8/2002 | Lerg | 704/273 |
| 2002/0120609 A1 | 8/2002 | Lang et al. | 707/1 |
| 2002/0124050 A1 | 9/2002 | Middeljans | 709/203 |
| 2002/0133354 A1* | 9/2002 | Ross et al. | 704/275 |
| 2002/0133402 A1 | 9/2002 | Faber et al. | 705/14 |
| 2002/0135618 A1* | 9/2002 | Maes et al. | 345/767 |
| 2002/0138248 A1 | 9/2002 | Corston-Oliver et al. | 704/1 |
| 2002/0143532 A1 | 10/2002 | McLean et al. | 704/235 |
| 2002/0143535 A1 | 10/2002 | Kist et al. | 704/251 |
| 2002/0161646 A1 | 10/2002 | Gailey et al. | 705/14 |
| 2002/0173333 A1 | 11/2002 | Buchholz et al. | 455/527 |
| 2002/0173961 A1 | 11/2002 | Guerra | 704/258 |
| 2002/0184373 A1 | 12/2002 | Maes | 709/228 |
| 2002/0188602 A1 | 12/2002 | Stubler et al. | 707/3 |
| 2002/0198714 A1 | 12/2002 | Zhou | 704/252 |
| 2003/0014261 A1 | 1/2003 | Kageyama | 704/275 |
| 2003/0016835 A1 | 1/2003 | Elko et al. | 381/92 |
| 2003/0046346 A1* | 3/2003 | Mumick et al. | 709/205 |
| 2003/0064709 A1 | 4/2003 | Gailey et al. | 455/412 |
| 2003/0065427 A1 | 4/2003 | Funk et al. | 701/1 |
| 2003/0069734 A1 | 4/2003 | Everhart | 704/275 |
| 2003/0088421 A1 | 5/2003 | Maes et al. | 704/270.1 |
| 2003/0097249 A1 | 5/2003 | Walker et al. | 704/1 |
| 2003/0110037 A1 | 6/2003 | Walker et al. | 704/257 |
| 2003/0112267 A1 | 6/2003 | Belrose | 345/728 |
| 2003/0115062 A1 | 6/2003 | Walker et al. | 704/258 |
| 2003/0120493 A1 | 6/2003 | Gupta | 704/270.1 |
| 2003/0135488 A1 | 7/2003 | Amir et al. | 707/3 |
| 2003/0144846 A1 | 7/2003 | Denenberg et al. | 704/277 |
| 2003/0158731 A1 | 8/2003 | Falcon et al. | 704/231 |
| 2003/0161448 A1 | 8/2003 | Parolkar et al. | 379/88.17 |
| 2003/0182132 A1 | 9/2003 | Niemoeller | 704/275 |
| 2003/0204492 A1 | 10/2003 | Wolf et al. | 707/3 |
| 2003/0206640 A1 | 11/2003 | Malvar et al. | 381/93 |
| 2003/0212550 A1 | 11/2003 | Ubale | 704/215 |
| 2003/0212558 A1 | 11/2003 | Matula | 704/260 |
| 2003/0212562 A1 | 11/2003 | Patel et al. | 704/275 |
| 2003/0225825 A1 | 12/2003 | Healey et al. | 709/203 |
| 2003/0236664 A1 | 12/2003 | Sharma | 704/251 |
| 2004/0006475 A1 | 1/2004 | Ehlen et al. | 704/270.1 |
| 2004/0010358 A1 | 1/2004 | Oesterling et al. | 701/49 |
| 2004/0025115 A1 | 2/2004 | Sienel et al. | 715/513 |
| 2004/0044516 A1 | 3/2004 | Kennewick et al. | 704/5 |
| 2004/0098245 A1 | 5/2004 | Walker et al. | 704/1 |
| 2004/0117179 A1 | 6/2004 | Balasuriya | 704/231 |
| 2004/0117804 A1 | 6/2004 | Scahill et al. | 719/320 |
| 2004/0122674 A1 | 6/2004 | Bangalore et al. | 704/270 |
| 2004/0140989 A1 | 7/2004 | Papageorge | 345/700 |
| 2004/0158555 A1 | 8/2004 | Seedman et al. | 707/3 |
| 2004/0166832 A1 | 8/2004 | Portman et al. | 455/412.1 |
| 2004/0167771 A1 | 8/2004 | Duan et al. | 704/10 |
| 2004/0172258 A1* | 9/2004 | Dominach et al. | 704/277 |
| 2004/0193408 A1 | 9/2004 | Hunt | 704/209 |
| 2004/0193420 A1 | 9/2004 | Kennewick et al. | 704/257 |
| 2004/0199375 A1 | 10/2004 | Ehsani et al. | 704/4 |
| 2004/0205671 A1 | 10/2004 | Sukehiro et al. | 715/532 |
| 2004/0243417 A9 | 12/2004 | Pitts, III et al. | 704/276 |
| 2005/0015256 A1 | 1/2005 | Kargman | 704/272 |
| 2005/0021334 A1 | 1/2005 | Iwahashi | 704/240 |
| 2005/0021470 A1 | 1/2005 | Martin et al. | 705/51 |
| 2005/0021826 A1 | 1/2005 | Kumar | 709/232 |
| 2005/0033574 A1 | 2/2005 | Kim et al. | 704/251 |
| 2005/0033582 A1 | 2/2005 | Gadd et al. | 704/277 |
| 2005/0043940 A1 | 2/2005 | Elder | 704/9 |
| 2005/0114116 A1 | 5/2005 | Fiedler | 704/201 |
| 2005/0125232 A1 | 6/2005 | Gadd | 704/270.1 |
| 2005/0131673 A1* | 6/2005 | Koizumi et al. | 704/2 |
| 2005/0137850 A1 | 6/2005 | Odell | 704/4 |
| 2005/0137877 A1 | 6/2005 | Oesterling et al. | 704/275 |
| 2005/0143994 A1 | 6/2005 | Mori et al. | 704/235 |
| 2005/0216254 A1 | 9/2005 | Gupta et al. | 704/9 |
| 2005/0234727 A1 | 10/2005 | Chiu | 704/270.1 |
| 2005/0246174 A1 | 11/2005 | DeGolia | 704/270 |
| 2005/0283752 A1 | 12/2005 | Fruchter et al. | 717/100 |
| 2006/0041431 A1 | 2/2006 | Maes | 704/270.1 |
| 2006/0047509 A1 | 3/2006 | Ding et al. | 704/231 |
| 2006/0206310 A1 | 9/2006 | Ravikumar et al. | 704/9 |
| 2006/0217133 A1 | 9/2006 | Christenson et al. | 455/461 |
| 2006/0285662 A1 | 12/2006 | Yin et al. | 379/88.16 |
| 2007/0033005 A1 | 2/2007 | Cristo et al. | 704/9 |
| 2007/0033020 A1 | 2/2007 | (Kelleher) Francois et al. | 704/226 |
| 2007/0038436 A1 | 2/2007 | Cristo et al. | 704/9 |
| 2007/0043569 A1* | 2/2007 | Potter et al. | 704/270 |
| 2007/0043574 A1* | 2/2007 | Coffman et al. | 704/275 |
| 2007/0043868 A1 | 2/2007 | Kumar et al. | 709/226 |
| 2007/0050191 A1 | 3/2007 | Weider et al. | 704/275 |
| 2007/0055525 A1 | 3/2007 | Kennewick et al. | 704/257 |
| 2007/0061067 A1 | 3/2007 | Zeinstra et al. | 701/200 |
| 2007/0061735 A1 | 3/2007 | Hoffberg et al. | 715/744 |
| 2007/0073544 A1 | 3/2007 | Millett et al. | 704/277 |
| 2007/0078708 A1 | 4/2007 | Yu et al. | 705/14 |
| 2007/0078709 A1 | 4/2007 | Rajaram | 705/14 |
| 2007/0118357 A1 | 5/2007 | Kasravi et al. | 704/10 |
| 2007/0135101 A1 | 6/2007 | Ramati et al. | 455/414.1 |
| 2007/0146833 A1 | 6/2007 | Satomi et al. | 358/537 |
| 2007/0162296 A1 | 7/2007 | Altberg et al. | 705/1 |
| 2007/0179778 A1 | 8/2007 | Gong et al. | 704/9 |
| 2007/0186165 A1 | 8/2007 | Maislos et al. | 715/728 |
| 2007/0198267 A1 | 8/2007 | Jones et al. | 704/257 |
| 2007/0203736 A1 | 8/2007 | Ashton | 705/1 |
| 2007/0214182 A1 | 9/2007 | Rosenberg | 707/104.1 |
| 2007/0250901 A1 | 10/2007 | McIntire et al. | 725/146 |
| 2007/0265850 A1 | 11/2007 | Kennewick et al. | 704/257 |
| 2007/0299824 A1 | 12/2007 | Pan et al. | 707/3 |
| 2008/0034032 A1 | 2/2008 | Healey et al. | 709/203 |
| 2008/0065386 A1 | 3/2008 | Cross et al. | 704/270 |
| 2008/0091406 A1 | 4/2008 | Baldwin et al. | 704/4 |
| 2008/0103761 A1 | 5/2008 | Printz et al. | 704/9 |
| 2008/0109285 A1 | 5/2008 | Reuther et al. | 705/7 |
| 2008/0115163 A1 | 5/2008 | Gilboa et al. | 725/34 |
| 2008/0133215 A1 | 6/2008 | Sarukkai | 704/2 |
| 2008/0140385 A1 | 6/2008 | Mahajan et al. | 704/9 |
| 2008/0147410 A1 | 6/2008 | Odinak | 704/270.1 |
| 2008/0154604 A1 | 6/2008 | Sathish et al. | 704/257 |
| 2008/0177530 A1 | 7/2008 | Cross et al. | 704/4 |
| 2008/0189110 A1 | 8/2008 | Freeman et al. | 704/251 |
| 2008/0235023 A1 | 9/2008 | Kennewick et al. | 704/257 |
| 2008/0235027 A1 | 9/2008 | Cross | 704/270.1 |
| 2008/0319751 A1 | 12/2008 | Kennewick et al. | 704/257 |
| 2009/0052635 A1 | 2/2009 | Jones et al. | 379/88.02 |
| 2009/0067599 A1 | 3/2009 | Agarwal et al. | 379/114.21 |
| 2009/0076827 A1 | 3/2009 | Bulitta et al. | 704/275 |
| 2009/0106029 A1 | 4/2009 | DeLine et al. | 704/275 |
| 2009/0117885 A1 | 5/2009 | Roth | 455/414.3 |
| 2009/0144271 A1 | 6/2009 | Richardson et al. | 707/5 |
| 2009/0150156 A1 | 6/2009 | Kennewick et al. | 704/257 |
| 2009/0171664 A1 | 7/2009 | Kennewick et al. | 704/257 |
| 2009/0216540 A1 | 8/2009 | Tessel et al. | 704/275 |
| 2009/0271194 A1 | 10/2009 | Davis et al. | 704/235 |
| 2009/0273563 A1 | 11/2009 | Pryor | 345/157 |
| 2009/0276700 A1 | 11/2009 | Anderson et al. | 715/700 |
| 2009/0299745 A1 | 12/2009 | Kennewick et al. | 704/257 |
| 2009/0307031 A1 | 12/2009 | Winkler et al. | 705/7 |
| 2009/0313026 A1 | 12/2009 | Coffman et al. | 704/275 |
| 2010/0023320 A1 | 1/2010 | Di Cristo et al. | 704/9 |
| 2010/0029261 A1 | 2/2010 | Mikkelsen et al. | 455/419 |
| 2010/0036967 A1 | 2/2010 | Caine et al. | 709/236 |
| 2010/0049501 A1 | 2/2010 | Kennewick et al. | 704/9 |
| 2010/0049514 A1 | 2/2010 | Kennewick et al. | 704/233 |
| 2010/0057443 A1 | 3/2010 | Di Cristo et al. | 704/9 |
| 2010/0063880 A1 | 3/2010 | Atsmon et al. | 705/14.53 |
| 2010/0145700 A1 | 6/2010 | Kennewick et al. | 704/257 |
| 2010/0185512 A1 | 7/2010 | Borger et al. | 705/14.49 |
| 2010/0204986 A1 | 8/2010 | Kennewick et al. | 704/226 |
| 2010/0204994 A1 | 8/2010 | Kennewick et al. | 704/257 |
| 2010/0217604 A1 | 8/2010 | Baldwin et al. | 704/275 |
| 2010/0286985 A1 | 11/2010 | Kennewick et al. | 704/257 |
| 2010/0299142 A1 | 11/2010 | Freeman et al. | 704/9 |
| 2010/0312566 A1 | 12/2010 | Odinak et al. | 704/275 |
| 2011/0112827 A1 | 5/2011 | Kennewick et al. | 704/9 |

(56) References Cited

U.S. PATENT DOCUMENTS

| | | | |
|---|---|---|---|
| 2011/0112921 | A1 | 5/2011 | Kennewick et al. ......... 705/26.1 |
| 2011/0131036 | A1 | 6/2011 | Di Cristo et al. ................. 704/9 |
| 2011/0131045 | A1 | 6/2011 | Cristo et al. ................. 704/249 |
| 2011/0231182 | A1 | 9/2011 | Weider et al. ..................... 704/9 |
| 2011/0231188 | A1 | 9/2011 | Kennewick et al. .......... 704/236 |
| 2012/0022857 | A1 | 1/2012 | Baldwin et al. .................... 704/9 |
| 2012/0101809 | A1 | 4/2012 | Kennewick et al. .............. 704/9 |
| 2012/0101810 | A1 | 4/2012 | Kennewick et al. .............. 704/9 |
| 2012/0109753 | A1 | 5/2012 | Kennewick et al. ....... 705/14.58 |
| 2012/0150636 | A1 | 6/2012 | Freeman et al. .......... 705/14.49 |
| 2012/0278073 | A1 | 11/2012 | Weider et al. ................. 704/235 |
| 2013/0054228 | A1 | 2/2013 | Baldwin et al. .................... 704/9 |
| 2013/0211710 | A1 | 8/2013 | Kennewick et al. ............ 701/419 |
| 2013/0297293 | A1 | 11/2013 | Di Cristo et al. ................. 704/9 |
| 2013/0304473 | A1 | 11/2013 | Baldwin et al. ............... 704/257 |
| 2013/0339022 | A1 | 12/2013 | Baldwin et al. ............... 704/257 |
| 2014/0012577 | A1 | 1/2014 | Freeman et al. ............. 704/249 |
| 2014/0108013 | A1 | 4/2014 | Di Cristo et al. ............. 704/254 |
| 2014/0156278 | A1 | 6/2014 | Kennewick et al. .......... 704/254 |

FOREIGN PATENT DOCUMENTS

| | | |
|---|---|---|
| JP | 2006-146881 | 6/2006 |
| JP | 2008-027454 | 2/2008 |
| JP | 2008-139928 | 6/2008 |
| WO | WO 99/46763 | 9/1999 |
| WO | WO 00/21232 | 4/2000 |
| WO | WO 00/46792 | 8/2000 |
| WO | WO 01/78065 | 10/2001 |
| WO | WO 2004/072954 | 8/2004 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aerosp. Electron. Systems Magazine*, vol. 14, No. 9, Sep. 1999, pp. 27-32.

Zhao, Yilin, "Telematics: Safe and Fun Driving", *IEEE Intelligent Systems*, vol. 17, Issue 1, 2002, pp. 10-14.

Chai et al., "MIND: A Semantics-Based Multimodal Interpretation Framework for Conversational System", *Proceedings of the International CLASS Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Communication* (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.

O'Shaughnessy, Douglas, "Interacting with Computers by Voice: Automatic Speech Recognition and Synthesis", *Proceedings of the IEEE*, vol. 91, No. 9, Sep. 1, 2003, XP011100665, pp. 1272-1305.

Statement in Accordance with the Notice from the European Patent Office dated Oct. 1, 2007 Concerning Business Methods (OJ EPO Nov. 2007, 592-593), XP002456252.

* cited by examiner

MOBILE SYSTEMS AND METHODS OF SUPPORTING NATURAL LANGUAGE HUMAN-MACHINE INTERACTIONS

CROSS-REFERENCE TO RELATED APPLICATIONS

This application is a continuation of U.S. patent application Ser. No. 13/488,299, filed on Jun. 4, 2012 (which issued as U.S. Pat. No. 8,447,607 on May 21, 2013), which is a continuation of U.S. patent application Ser. No. 13/084,197, filed on Apr. 11, 2011 (which issued as U.S. Pat. No. 8,195,468 on Jun. 5, 2012), which is a divisional of U.S. patent application Ser. No. 11/212,693, entitled "Mobile Systems and Methods of Supporting Natural Language Human-Machine Interactions," filed Aug. 29, 2005 (which issued as U.S. Pat. No. 7,949,529 on May 24, 2011), the contents of which are hereby incorporated by reference in their entirety.

FIELD OF THE INVENTION

The invention provides mobile devices having a speech interface and/or a combination of a speech interface and a non-speech interface to enable natural language human-machine interactions. More specifically, the invention enables mobile users to submit natural language speech and/or non-speech questions or commands in a wide range of domains. The mobile device is configured to present responses in a natural manner.

BACKGROUND OF THE INVENTION

Telematic systems are systems that bring human-computer interfaces to mobile environments. Conventional computer interfaces use some combination of keyboards, keypads, point and click techniques and touch screen displays. These conventional interface techniques are generally not suitable for mobile environments, due at least in part to the speed of interaction and the inherent danger and distraction. Therefore, speech interfaces are being adopted in many telematic applications.

However, creating a natural language speech interface that is suitable for use in the mobile environment has proved difficult. A general-purpose telematics system should accommodate commands and requests from a wide range of domains and from many users with diverse preferences and needs. Further, multiple mobile users may want to use such systems, often simultaneously. Finally, most mobile environments are relatively noisy, making speech recognition inherently difficult.

Retrieval of both local and network hosted online information and processing of commands in a natural manner remains a difficult problem in any environment, especially a mobile environment. Cognitive research on human interaction shows that verbal communication, such as a person asking a question or giving a command, typically relies heavily on context and domain knowledge of the target person. By contrast, machine-based requests (a request may be a question, a command, and/or other types of communications) may be highly structured and may not be inherently natural to the human user. Thus, verbal communications and machine processing of requests that are extracted from the verbal communications may be fundamentally incompatible. Yet the ability to allow a person to make natural language speech-based requests remains a desirable goal.

Research has been performed on multiple fields of natural language processing and speech recognition. Speech recognition has steadily improved in accuracy and today is successfully used in a wide range of applications. Natural language processing has previously been applied to the parsing of speech queries. Yet, a limited number of systems have been developed that provide a complete environment for users to make natural language speech requests and/or commands and receive natural sounding responses in a mobile environment. There remain a number of significant barriers to creation of a complete natural language verbal and/or textual-based query and response environment.

The fact that most natural language requests and commands are incomplete in their definition is a significant barrier to natural language query-response interaction. Further, some questions can only be interpreted in the context of previous questions, knowledge of the domain, or the user's history of interests and preferences. Thus, some natural language questions and commands may not be easily transformed to machine processable form. Compounding this problem, many natural language questions may be ambiguous or subjective. In these cases, the formation of a machine processable query and returning of a natural language response is difficult at best.

Even once a question is asked, parsed and interpreted, machine processable requests and commands must be formulated. Depending on the nature of the question, there may not be a simple set of requests that return an adequate response. Several requests may need to be initiated and even these requests may need to be chained or concatenated to achieve a complete result. Further, no single available source may include the entire set of results required. Thus, multiple requests, perhaps with several parts, may need to be made to multiple data sources, which can be located both locally or remotely. Not all of these sources and requests may return useful results or any results at all.

In a mobile environment, the use of wireless communications may further reduce the chances that requests will be complete or that successful results will be returned. Useful results that are returned are often embedded in other information and may need to be extracted therefrom. For example, a few key words or numbers often need to be "scraped" from a larger amount of other information in a text string, table, list, page, or other information. At the same time, other extraneous information such as graphics or pictures may need to be removed to process the response in speech. In any case, the multiple results should be evaluated and combined to form the best possible answer, even in the case where some requests do not return useful results or fail entirely. In cases where the question is ambiguous or the result inherently subjective, determining the best result to present is a complex process. Finally, to maintain a natural interaction, responses should be returned rapidly to the user. Managing and evaluating complex and uncertain requests, while maintaining real-time performance, is a significant challenge.

These and other drawbacks exist in existing systems.

SUMMARY OF THE INVENTION

The invention overcomes these and other drawbacks of prior telematic systems.

According to one aspect of the invention, speech-based and non-speech-based systems are provided that act on commands and retrieve information. The invention uses context, prior information, domain knowledge, and user specific profile data to achieve a natural environment for users that submit requests and/or commands in multiple domains. At each step in the process, accommodation may be made for full or partial failure and graceful recovery. The robustness to partial failure may be achieved through the use of probabilistic and fuzzy reasoning at several stages of the process. This robustness to partial failure promotes the feeling of a natural response to questions and commands.

According to another aspect of the invention, the interactive natural language system (herein "the system") may be incorporated into mobile devices or may be connected to the mobile device via a wired or wireless connection. The mobile device may interface with computers or other electronic control systems through wired or wireless links. The mobile device may also operate independently of a mobile structure and may be used to remotely control devices through a wireless local area connection, a wide area wireless connection or through other communication links.

According to one aspect of the invention, software may be installed onto the mobile device that includes an input module that captures the user input; a parser that parses the input, a text to speech engine module for converting text to speech; a network interface for enabling the device to interface with one or more networks; a non-speech interface module, an event manager for managing events and/or other modules. In some embodiments, the event manager may be in communication with a context description grammar, a user profile module that enables user profiles to be created, modified and/or accessed, a personality module that enables various personalities to be created and/or used, an agent module, an update manager and one or more databases. It will be understood that this software may be distributed in any way between a mobile device, a computer attached to a mobile structure, a desktop computer or a server without altering the function, features, scope, or intent of the invention.

According to one aspect of the invention, the system may include a speech unit interface device that receives spoken natural language requests, commands and/or other utterances from users, and a computer device or system that receives input from the speech unit and processes the input and responds to the user with a natural language speech response.

According to another aspect of the invention, the system may be interfaced by wired or wireless connections to one or more other systems. The other systems may themselves be distributed between electronic controls or computers that are attached to a mobile structure or are located external to the mobile structure. The other systems may include, electronic control systems, entertainment devices, navigation equipment, measurement equipment or sensors, or other systems. External systems may also be provided with features that include payment systems, emergency assistance networks, remote ordering systems, automated or attended customer service functions, or other features.

According to another aspect of the invention, the system may be deployed in a network of devices that share a common base of agents, data, information, user profiles, histories or other components. Each user may interact with, and receive, the same services and applications at any location equipped with the mobile device on the network. For example, multiple mobile devices may be placed at different locations throughout a home, place of business, vehicle or other location. In such a case, the system can use the location of the particular device addressed by the user as part of the context for the questions asked.

According to one embodiment of the invention, processing may be performed at the mobile devices. The commands may be processed on-board to enable the mobile devices to control themselves and/or to control other mobile devices, fixed computers, mobile telephones, and other devices. Additionally, mobile devices may track context.

According to one embodiment of the invention, infrastructure may be provided to maintain context information during multimodal interactions, such as speech and/or non-speech interactions. According to one exemplary embodiment of the invention, context information may be maintained in a multimodal environment by providing communication channels between mobile device, or multimodal devices, and the system. The communication channels allow the system to receive multimodal input such as text-based commands and questions and/or voice-based commands and questions. According to another embodiment of the invention, the multimodal input may include a string of text, such as keywords, that are received as commands or questions. According to yet another embodiment of the invention, the system may synchronize the context between the mobile devices and the speech-based units. In order to send a response to the corresponding mobile device, the system may track the source and send the response to the corresponding speech interface or the non-speech interface.

According to an alternative embodiment of the invention, context information may be maintained using a context manager that may be centrally positioned to receive input from multiple mobile devices and to provide output to multiple mobile devices. According to one embodiment, the mobile devices that communicate with the context manager may register through a registration module and may subscribe to one or more events. According to another embodiment of the invention, the context manager may receive input in Context XML form, for example. The other registered mobile devices may be informed of context changes through a context tracking module to enable synchronizing of context across the registered modules. According to one embodiment of the invention, registered modules may be added or removed from the system. The registered modules may include dynamic link libraries (DLLs), or other information sources, that are specific to multimodal devices.

According to yet another alternative embodiment of the invention, context information may be determined from a command or request that is presented in a textual format and/or a command or request that is presented as an utterance and processed using a multi-pass automatic speech recognition module that transcribes the utterance to a text message. The command or request may be compared against a context description grammar to identify a match. Any active grammars in the context description grammar may be scored against the command or request and a best match may be sent to a response generator module. Agents may be associated with corresponding response generator modules and may retrieve the requested information for generation of a response. The agents may update a context stack to enable follow-up requests.

According to another embodiment of the invention, mobile devices may be configured to allow verbal annotations of objects stored thereon. Mobile devices may transcribe the verbal annotation to text and store the textual annotation with the object. Alternatively, mobile devices may be configured to enable users to manually input textual descriptions that are stored along with the objects. According to one embodiment of the invention, the textual annotations and/or textual descriptions may be classified and searched. In an alternative embodiment, mobile devices may classify and search the verbal annotations rather than textual annotations. However, classifying and searching verbal annotations may be considerably more difficult than classifying and searching textual annotations and/or textual descriptions.

According to one embodiment of the invention, the textual annotations and textual descriptions may be communicated using a short message service on the mobile telephone or other device. Short message service is a text message service that enables sending and receiving of short textual messages. The textual messages may be stored at data centers for forwarding to intended recipients. Other configurations may be used.

According to another aspect of the invention, domain specific behavior and information may be organized into data managers. Data managers are autonomous executables that receive, process and respond to user questions, queries and commands. The data managers provide complete, convenient and re-distributable packages or modules of functionality that are typically directed to a specific domain of applications. Data managers may be complete packages of executable code, scripts, links to information, and other forms of communication data that provide a specific package of functionality, usually in a specific domain. In other words, data managers may include components for extending the functionality to a new domain. Further, data managers and their associated data may be updated remotely over a network as new behavior is added or new information becomes available. Data managers may use system resources and the services of other, typically more specialized, data managers. Data managers may be distributed and redistributed in a number of ways including on removable storage media, transfer over networks or attached to emails and other messages. An update manager may be used to add new data managers to the system or update existing data managers.

In order to enhance the natural query and response environment, the system may format results to increase understandability to users. Formatting and presentation of results may be based on the context of the questions, the contents of the response being presented, the history of the interaction with the user, the user's preferences and interests and the nature of the domain. By contrast, rigid, highly formatted, or structured presentation of results may be deemed unnatural by many users.

According to another embodiment of the invention, the system may simulate some aspects of a human "personality". In some cases, the presentation of the response and the terms that are used to provide the response may be randomized to avoid the appearance of rigidly formatted or mechanical responses. The use of other simulated personality characteristics is also desirable. For example, a response that may be upsetting to the user may be presented in a sympathetic manner. Furthermore, results of requests may be long text strings, lists, tables or other lengthy sets of data. Natural presentation of this type of information presents particular challenges because simply reading the long response is generally not preferred. Instead, the system may parse important sections from the response and may initially provide only reports. Determining what parts of a long response are presented may be based on the context of the questions, the contents of the response being presented, the history of the interaction with the user, the user's preferences and interests and the nature of the domain. At the same time, the system may give the user interactive control over what information to present and how much information to present, to stop the response all together, or to take other actions.

The invention may be applied as a user interface to telematics systems in a wide variety of environments. These environments may include, but are not limited to, the following: 1) personal automobiles, rented automobiles, or fleet automobiles; 2) motorcycles, scooters, and other two wheeled or open-air vehicles; 3) commercial long-haul and short haul trucks; 4) delivery service vehicles; 5) fleet service vehicles; 6) industrial vehicles; 7) agricultural and construction machinery; 8) water-borne vehicles; 9) aircraft; and, 10) specialized military, law enforcement and emergency vehicles.

According to another aspect of the invention, the system may process and respond to questions, requests and/or commands. Keywords or context may be used to determine whether the received utterance and/or textual message include a request or command. For example, utterances may include aspects of questions, requests and/or commands. For example, a user may utter "tune in my favorite radio station." A request is processed to determine the name, the channel, and time for the user's favorite radio station. If the programming on that station is of a type the user generally does not listen to, the system can suggest using an alternative option, such as listening to a CD more likely to please the user. A command must be executed to set a tune the radio station.

The invention can be used for generalized local or network information query, retrieval and presentation in a mobile environment. For each user utterance, including a question or query or set of questions or queries, the system may perform multiple steps possibly including: 1) capturing the user's question or query through speech recognition operating in a variety of real-world environments; 2) parsing and interpreting the question or query; 3) determining the domain of expertise required and the context to invoke the proper resources, including agents; 4) formulating one or more queries to one or more local and/or network data sources or sending appropriate commands to local or remote devices or the system itself; 5) performing required formatting, variable substitutions and transformations to modify the queries to a form most likely to yield desired results from the available sources; 6) executing the multiple queries or commands in an asynchronous manner and dealing gracefully with failures; 7) extracting or scraping the desired information from the one or more results, which may be returned in any one of a number of different formats; 8) evaluating and interpreting the results, including processing of errors, gathered and combine them into a single best result judged to be "best" even if the results are ambiguous, incomplete, or conflicting; 9) performing required formatting, variable substitutions and transformations to modify the results to a form most easily understood by the user; 10) presenting the compound result, through a text to speech engine or multimodal interface, to the user in a useful and/or expected manner; 11) optionally, providing a response to users indicating the success or failure of the command, and possibly including state information; or other steps.

The above steps may be performed with knowledge of the domain of expertise, the context for the question or command, domain specific information, the history of the user's interactions, user preferences, available information sources or commands, and responses obtained from the sources.

Probabilistic or fuzzy set decision and matching methods may be applied to deal with inconsistent, ambiguous, conflicting and incomplete information or responses. In addition, asynchronous queries may be used to provide rapid and graceful failure of requests or commands that allow the system to robustly return results quickly and in a manner that seems natural to the user.

Many everyday questions are inherently subjective and result in answers that are a matter of opinion or consensus, as much as fact. Such questions are often ad hoc in their nature, as well. The system, according to another aspect of the invention, may use adaptive, probabilistic, and fuzzy set decision and matching methods to identify the subjective nature of the question and to evaluate a range of possible answers, wherein one or more answers may be selected that most accurately represent the type of result desired by the user.

The context and expected results from a particular question may be highly dependent on the individual asking the question. Therefore, the system may create, store and use personal profile information for each user. Information in the profile may be added and updated automatically as the user uses the system or may be manually added or updated by the user or by others. Domain specific agents may collect, store and use specific profile information, as may be required for optimal operations. Users may create commands for regularly used reports, automatically generated alerts, and other requests and for the formatting and presentation of results. The system may use profile data in interpreting questions, formulating requests, interpreting request results and presenting answers to the user. Examples of information in a user profile includes, history of questions asked, session histories, formatting and presentation preferences, special word spelling, terms of interest, special data sources of interest, age, sex, education, location or address, place of business, type of business, investments, hobbies, sports interests, news interests and other profile data.

According to one aspect of the invention, the system may attempt to provide rapid responses in order to provide a natural question and response environment. The rapid responses may be provided without obtaining additional information. The system may determine agent composition, context and/or domain for a user's question or command, for example, by using a real-time scoring system or other technique. Based on this determination, the system may trigger one or more agents to respond to the user's question or command. The agents may make one or more requests and rapidly return a formatted response. Thus, users may receive direct responses to a set of questions, each with a different response or context. In some cases, the available information, including the request results, may not adequately answer the questions presented. In such situations, the user may be asked one or more follow-up questions to resolve the ambiguity. Additional requests may then be made before an adequate response is provided. In these cases, the system may use context information, user profile information and/or domain specific information to minimize the interaction with the user required to deliver a response.

If the confidence level of the domain or context score is not high enough to ensure a reliable response, the system may request that the user verify that the question or command is correctly understood. In general, the question may be phrased to indicate the context of the question including all criteria or parameters. If the user confirms that the question is correct, the system may proceed to produce a response. Otherwise, either the user can rephrase the original question, perhaps adding additional information to remove ambiguity, or the system may ask one or more questions to attempt to resolve the ambiguity or other actions may taken.

According to one aspect of the invention, the system may accept any natural language question or command and, as a result, may be subject to ambiguous requests. To assist users in formulating concise questions and commands, the system may support a voice query language. The language may help users clearly specify the keywords or contexts of the question or command along with the parameters or criteria. The system may provide built in training capabilities to help the user learn the best methods to formulate their questions and commands.

In order to make the responses to user's questions and commands seem more natural, the system may employ one or more dynamically invokeable personalities and/or emotional models. Personalities and emotional models have specific characteristics that simulate the behavioral characteristics of real humans. Examples of these characteristics include sympathy, irritation, and helpfulness and associated emotions. The personality also randomizes aspects of responses, just as a real human would do. This behavior includes randomization of terms used and the order of presentation of information. Characteristics of the personality and/or emotions are invoked using probabilistic or fuzzy set decision and matching methods and using criteria, including the context for the question, the history of the user's interaction, user preferences, information sources available, and responses obtained from the sources.

According to another aspect of the invention, special procedures may be employed to present information in the form of long text strings, tables, lists or other long response sets. Simply presenting a long set of information in an ordered manner may not be considered natural or what most users have in mind. The system may use probabilistic or fuzzy set matching methods to extract relevant information and present these subsets first. Further the system may provide commands allowing users to skip through the list, find keywords or key information in the list or stop processing the list altogether.

According to one embodiment of the invention, the system may support multiple users that access the system at different times. According to another embodiment of the invention, the system may support multiple users that access the system during a same session, in an interleaved or overlapping manner. The system may recognize the multiple users by name, voice, or other characteristic and may invoke a correct profile for each user. If multiple users are addressing the system in overlapping or interleaved sessions, the system may identify the multiple users and may invoke one or more corresponding profiles. For applications that require security safeguards, the multiple users may be verified using voiceprint matching, password or pass-phrase matching, or other security safeguards.

When multiple users are engaged in interleaved sessions, the system may gracefully resolve conflicts using a probabilistic or fuzzy set decision method for each user. This process may simulate the manner in which a human would address multiple questions from various sources. For example, the system may answer short questions first in time while answering longer questions later in time. Alternatively, the system may answer questions in the order that they are received, among other configurations.

Since the invention may operate in many environments, including mobile environments with background noise, point noise sources and people holding conversations, filtering of speech input may be advantageous. The invention may use, for example, either one-dimensional or two-dimensional array microphones (or other devices) to receive human speech. The array microphones may be fixed or employ dynamic beam forming techniques. The array pattern may be adjusted to maximize gain in the direction of the user and to null point noise sources. Alternatively, microphones may be placed at particular locations within the mobile environment near where occupants are likely to use the system. These microphones can be single microphones, directional microphones or an array of microphones. Speech received at the microphones may then be processed with analog or digital filters to optimize the bandwidth, cancel echoes, notch-out narrow band noise sources, or perform other functions. Following filtering, the system may use variable rate sampling to maximize the fidelity of the encoded speech, while minimizing required bandwidth. This procedure may be particularly useful in cases where the encoded speech is transmitted over a wireless network or link.

The invention can be applied to a wide range of telematics applications. General applications areas can include, but are not limited to remote or local vehicle control, information query, retrieval and presentation from local or network sources, safety applications, and security applications.

The system may provide local or remote control functions for the system, including devices that are located on the mobile structure or off the mobile structure. Users may initiate commands locally or remotely. Typically, remote operation may be conducted through an IP connection, a telephone connection, or other connections. The user may address spoken commands to a mobile device or desktop unit, which may send the commands to controllers on the vehicle over wireless links. Other remote command techniques may be used. The system may process commands in a nearly identical manner to a request. One difference being that the result of the command is generally an action rather than a response. In many cases, the system may give the user a cue or response to indicate that the command has been successfully executed or has failed. In cases of failure, an interactive session may be started to allow the user to resolve the difficulty or formulate a command more likely to succeed.

The invention provides users, including mobile structure operators, with the capability to control most any mobile system functions using interactive speech and non-speech commands and/or requests. Generally, controls of a critical nature, or having safety implications, may employ fail-safe checks that, before execution, verify that a command will not create a hazardous condition. Manual overrides may also be provided as an extra precaution. The invention may provide built in help and user guidance for the devices under control. This guidance may include step-by-step training for operators that are learning to use the features of the mobile structure. The system can provide extensive interactive guidance when commands cannot be executed or when commands fail. This advice may include suggestions to reformulate the command to succeed, suggestions to work around a failure, suggestions for alternative commands that may achieve a similar function, or other suggestions. Examples of control functions that can be performed from local or remote locations by the invention include:

1. Control of mobile structure multimedia entertainment electronics, such as radio, CD player, or video player. This control can be based on user specified play lists and may be sensitive to user profile information including, preferences history, or other information. The invention may include the ability to control multiple or individual multimedia entertainment stations.
2. Control of communications devices such as cell phones, voice mail systems, fax systems, text or instant messaging systems, call and message forwarding systems, email systems and other communication devices. This control includes controlling features such as, address books, phone books, call forwarding, conference calling, and voice mail, among others.
3. Local or remote control of mobile structure systems. Most any device on the mobile structure may be controlled including, door locks, window controls, interior temperature controls, shifting of the transmission, turn signals, lights, safety equipment, engine ignition, cruse control, fuel tank switches, seat adjustments, specialized equipment such as winches, lifting systems or loading systems, and other mobile structure systems.
4. Systems that are located external to the mobile structure typically may be controlled through wireless links including, garage door openers, gate controllers, mobile structure entry security passes, automated toll collection systems, and mobile structure weighing systems and other external systems.
5. Mobile structure power management and systems control. The invention may provide the mobile structure operator with information on limitations and on tips for better power management or fuel utilization or other systems control.
6. Diagnostic information management. The invention may provide diagnostic information announcements and warnings for the mobile structure operator. These announcements and warnings may be interactive allowing the operator to request additional information or to suggest various courses of action. The invention may mediate a solution to the problem, including providing access to a scheduling service, summoning help or providing instructions for remedial action until a permanent solution can be achieved. The system can ask the operator to authorize the ordering of needed parts and may provide cost estimates. The system may receive data for these announcements and warnings from a wide range of sources including sensors and vehicle control computers. Sensors may include fuel level sensors, coolant temperature sensors, oil temperature sensors, axle temperature sensors, tire pressure sensors, and other sensors.
7. System status inquiry. Mobile structure operators may use the interactive natural language interface of the invention to query and receive reports on the status of systems that are located on the mobile structure including, fuel level, interior temperature, outside temperature, engine or other mobile structure system status. The operator can further query the system to receive more information or determine a course of action if problem is detected.
8. Vehicle service history. The invention can provide the vehicle operator or other personnel with interactive access to the vehicle service history. The invention can provide announcements or warnings as the time for service draws near. The user can interact with the system to schedule the required service, order required parts, receive cost estimates, or update the service history. Users may customize the nature of this interaction to suit their desires or policies.
9. Diagnostic and service history. The invention may provide diagnostic and service history information to service personnel. This information may include vehicle fault codes and other information for devices that are under control of or measured by the system. Alternatively, the invention may receive information on the state and history of vehicle operation from other control computers. The invention may provide interactive service information and history. The service history may be queried and presented through the speech interface or the non-speech interface. The system may prompt service personnel for more information if the record is deemed incomplete. In other cases, the invention may prompt service personnel for information on their actions if a change is detected in system status, such as replacement of a part.

The invention can provide users or operators of a mobile structure with specialized safety functions through the interactive speech interface and/or non-speech interface. The invention may use a dynamically evocable personality that is capable of creating announcements that are appropriate for the severity of the situation. The announcements and personalities may be under user control and configuration. Some examples of these safety applications can include:

1. The invention can provide automated detection and reporting of accident situations through the wireless communications link. Information on an accident situation can be gathered from airbag control systems or other sensors. Once an accident situation has been detected the invention may use the interactive speech interface and/or non-speech interface to determine the nature of the accident and/or the condition of victims. This information, along with location information and other relevant information, may be reported over the wireless link. Alternatively, the invention may establish voice channel communications or other communications between occupants of the vehicle and emergency personnel.

2. The invention can be used to store and retrieve medical information on vehicle occupants. Following an accident, emergency personnel may query the system for this information. Alternatively, the system may annunciate a warning to emergency personnel if a person has a special medical condition. The system maintains the security of medical information through a number of techniques, including not annunciating medical information unless an accident is detected, or not annunciating medical information unless that person or another authorized person gives permission.

3. Occupants of the vehicle can summon help in the event of a crime using the speech interface and/or non-speech interface. Typical crimes may include robberies and hijackings. The invention allows vehicle occupants to set panic or emergency words or phrases that indicate to the system a crime is occurring.

4. The invention can provide the vehicle operator with safety announcements if an unsafe or potentially unsafe situation is detected. The operator can use the interactive speech interface and/or non-speech interface to obtain more information on the situation or dismiss the alert. The operator can annunciate or otherwise provide commands to remedy or mitigate the situation during this dialog. Conditions that can be announced include, following another vehicle too closely, too great a speed for the road or conditions, obstruction on roadway, a fire in some part of the vehicle, high cargo pressure or temperature, leaks, and other information.

5. The interactive speech interface and non-speech interface of the invention can provide the operator with real-time assistance. This assistance may include, aid in parking or backing a vehicle, aid with complex maneuvers, aid with optimal operation of the vehicle, and other operations. The operator can ask the system for advice or assistance with a planned maneuver or operation. Alternatively, the invention can proactively offer assistance if certain situations are detected.

6. The interactive speech interface and non-speech interface may be used to improve vehicle security. Voiceprints or voice authentication can be used to gain access to the vehicle or start the vehicle. Alternatively or in addition, a password or pass-phrase can be used. In another alternative speech security can be used as a supplement to other vehicle security techniques.

7. The invention can provide measurement of operator fatigue and alert the operator or remote personnel if unacceptable levels of fatigue are detected. The interactive speech interface and/or non-speech interface can be used to query the operator to detect fatigue. Alternatively, or in addition, other measurements of operator fatigue can be used. If a fatigue situation is detected the invention may initiate a dialog with the operator to determine the extent of the problem and if required, ask the operator to cease operation.

The invention can offer vehicle operators and occupants a variety of services that are useful while in the vehicle and/or while arriving at a destination. Further, users can employ the interactive natural language interface to customize these services to suit each individual. Some examples of services that can be supported by the natural-language interactive speech interface of the invention, include:

1. Providing vehicle operators with interactive directions to a destination or waypoint, wherein the user can specify a desired destination and any preferred waypoints. A destination can be specified in any manner including providing the name of a place, an address, a name of a person, a name of a business, or other type of information. As the trip progresses the system may provide the operator with continued directions and warnings if a mistake has been made. The operator can query the system for additional information or request less information. Generally, the system is interfaced with one or more navigation sensors and local or remote map databases. The invention may provide operators or passengers with alerts of upcoming points or interest, exits or stops, hazards, or other conditions. The users can query the system for more specific information. Alternatively, the invention can provide operators and occupants of the vehicle with an interactive guided tour. The system's information query, retrieval and presentation capability can be employed by users to receive additional information or points or items of interest during the tour and may take into account stored personal profile information for a user.

2. The invention can provide the operator of a vehicle with interactive dynamic routing information. The routing can be updated based on traffic conditions, weather conditions, facilities availability, and information provided by the operator. Generally, the system is interfaced with one or more navigation sensors, local or remote map databases, and sources of traffic, weather, and facilities use data.

3. The direction, routing and communications capabilities of the invention can be combined in an interactive system that helps one or more operators rendezvous at a predetermined destination or any other convenient midpoint. The operators may use the interactive natural language interface to communicate with the system to arrange the rendezvous, to receive directions as they travel to the rendezvous point and/or to communicate with the other operators.

4. The navigational capabilities of the invention may be used to place limits on where a vehicle is allowed to go and/or for how long. The system may employ the interactive natural language speech interface and/or non-speech interface to inform the operator when the vehicle is approaching or has exceeded a limit. The operator can query the system to determine the best course of action to return to limits or prevent exceeding them. Alternatively, the system can query the operator to determine why they are exceeding the limits or to mediate a negotiation to extend the limits if this is required by circumstances. This capability is useful in several situations including, keeping a delivery or passenger vehicle on a regular route, setting and enforcing use limits on teenagers, preventing an operator from using the vehicle in an unauthorized manner, or other situations.

5. The interactive natural language interface of the invention can be used to provide Customer Relationship Management (CRM) services to vehicle operators and passengers. The user can interact with the services offered via data networks, video signals, or audio. The interaction can be performed with automated services or a live Customer Service Representative. Interactions with the customer service representatives can be through any combination of possible techniques, such as, live audio, live video, electronic messaging or email, instant messaging, and other techniques. These services can be offered by a number of entities including, vehicle manufacturers, vehicle dealers, vehicle service organizations, automobile or travel clubs, wireless carriers, travel service organizations, or other organizations. The services offered can be personalized to the occupants of the vehicle using a variety of information including, user profile information, history, location, paths traveled, time of day, day of week, or other information. In addition, the system can offer customized services based on information about the vehicle, including paths traveled, distance, service history, type of equipment on vehicle. These services can be accessed while a person is an occupant in a vehicle, while the person is not an occupant but are using a wireless or wired network equipped mobile device or while using a wired or wireless network desktop system, among other situations. Examples of these services include:

a. Location based marketing programs wherein occupants of the vehicle receive promotional offers from merchants along a route of travel. Occupants can query the system for offers and promotions for goods, services, or other information, along the travel route. The system may apply other available information to form a response, including, the user profile, history, location, or other information. The system can provide optimized interactive routing assistance to the vehicle operator. Alternatively, the system can provide interactive offers and promotions for goods and services along the route, or in advance of a particular trip. Promotions can be offered for goods and services can include but are not limited to, travel services, groceries, prepared foods, vehicle service, fuel, entertainment, or other goods and services.

b. Remote ordering and payment for goods and services. The system can interactively present the menu or product catalog using the list and table presentation capabilities of the invention. The system may facilitate remote ordering by using location information, customer preferences, customer order history, etc. The system can manage a secure payment wallet for the users. Voiceprints, spoken passwords, and non-speech security methods (i.e. PIN pad, etc.) can be combined to create the appropriate level of security.

c. Travel services for occupants of the vehicle. These services can include, directories of travel and entertainment services, or reservations for entertainment restaurants, hotels and other accommodation. The system may present directories, lists and menus using its interactive list and table presentation capabilities. The travel service capability can be used in conjunction with the remote ordering and payment capabilities and the dynamic interactive routing capability.

d. Answer specialized travel related questions in areas such as vehicle registration, taxes, safety laws, required inspections, weight limits, insurance coverage requirements, insurance policy provisions, or other areas.

6. The invention can provide an operator or other occupant of a vehicle with an interactive location sensitive shopping list or a location and time sensitive task reminder list using the natural language interface. Users can create the list while in the vehicle, while on foot using a mobile device, or at a fixed location using a handheld or desktop device. A user may grant permission to other users to add tasks or shopping items to their lists. Once in the vehicle, the system may provide occupants with routing assistance to optimize travel time and may provide reminders of items to be purchased and tasks to be completed as the vehicle comes in close proximity to a particular location, type of merchant or other service provider, or when a set time has been reached, among other criteria.

7. Automatic interactive dispatch and reporting for fleet vehicles having vehicle operators or other vehicle occupants that use the speech interface and/or non-speech interface to interact with these services. These services can include, dynamic optimal routing, inventory of parts and other materials, ordering of required parts and materials, work orders, receipt generation, payments, or other services.

8. Sales force automation, sales reporting, contact database management, calendar management, and call routing. The system may employ its interactive list and table presentation capabilities to supply catalog and pricing information or other information. These services can use local or network data. Additional services can include, memos, reminders, activity lists, or other information.

Vehicle operators and other occupants can use the interactive natural language interactive interface of the invention to perform many types of information query, retrieval and presentation operations. Using the natural language interactive interface, users can modify the parameters of queries or specify the presentation formats for results. Data used to create a response can be from any combination of local and remote data sources. User specific data can be synchronized between systems fixed to one or more vehicles, mobile structures and desktop systems. Some examples of information query, retrieval and presentation applications for the invention include, but are not limited to the following:

1. White pages and yellow pages lookups to find, email addresses, telephone numbers, street addresses and other information for businesses and individuals. These services can be used in conjunction with other services, including remote ordering and payment, offers and promotions, mapping, and driving directions;

2. Management and access to personal address book, calendars and reminders for users;

3. Automatic telephone dialing, reading and sending emails, pages, instant messaging by voice, text or video and other communications control functions;

4. Selection, schedules and play list management for television, satellite broadcast, radio or other entertainment schedule. The available information can include reviews and other information on programming. The system may provide device control for users;

5. Weather information for the local area or other locations;

6. Stock and other investment information including, prices, company reports, profiles, company information, business news stories, company reports, analysis, price alerts, news alerts, portfolio reports, portfolio plans, or other information;

7. Local, national and international news information including headlines of interest by subject or location, story summaries, full stories, audio and video retrieval and play for stories;

8. Sports scores, news stories, schedules, alerts, statistics, background and history information, or other information;

9. The ability to subscribe interactively to multimedia information channels, including sports, news, business, different types of music and entertainment, applying user specific preferences for extracting and presenting information;

10. Rights management for information or content that is used or published;
11. Horoscopes, daily jokes and comics, crossword puzzle retrieval and display and related entertainment or diversions;
12. Interactive educational programs using local and network material, with lesson material level that is set based on user's profile, location of the vehicle, planned route of the vehicle, planned activities during the trip and including, interactive multimedia lessons, religious instruction, calculator, dictionary and spelling, geographic information, instruction for specialized tasks planned during the trip, language training, foreign language translation, presentation of technical manuals, and encyclopedias and other reference material.

It will be appreciated that the foregoing statements of the features of the invention are not intended as exhaustive or limiting, the proper scope thereof being appreciated by reference to this entire disclosure and reasonably apparent variations and extensions thereof.

BRIEF DESCRIPTION OF THE DRAWINGS

The invention will be described by reference to the preferred and alternative embodiments thereof, in conjunction with the drawings in which.

DETAILED DESCRIPTION

The following detailed description refers to the accompanying drawings, and describes exemplary embodiments of the invention. Other embodiments are contemplated and modifications may be made to the exemplary embodiments without departing from the spirit, functionality and scope of the invention. Therefore, the following detailed descriptions are not meant to limit the invention.

Figure 1:
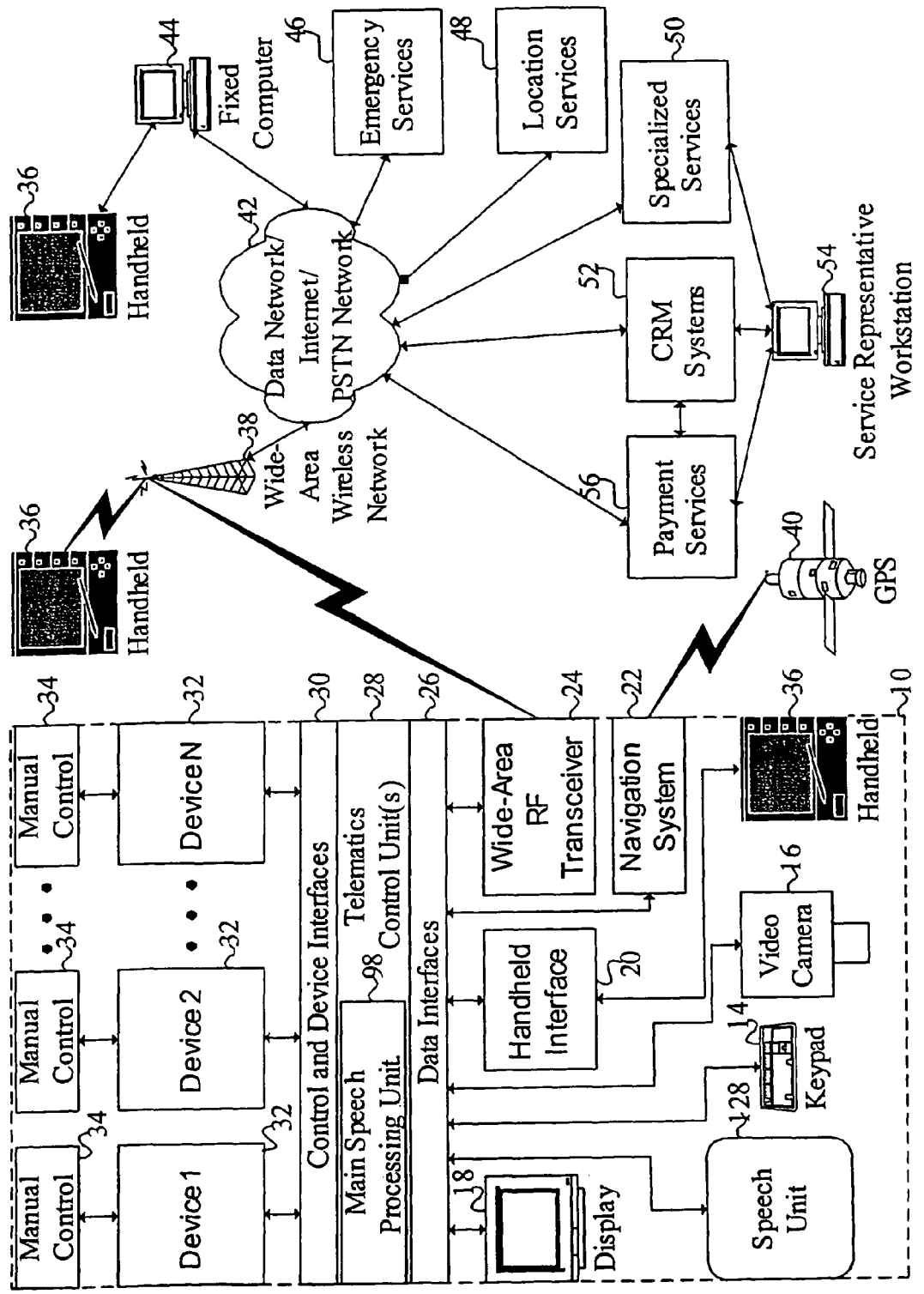
FIG. 1 is an overall block diagram of the system according to a first embodiment of the invention.

According to one embodiment of the invention, a telematic natural language speech interface and non-speech interface are provided for use in mobile environments and telematic applications. The system, or portions thereof, may be used in vehicles, while on foot or at a fixed location such as an office or home, or at other locations. An overall block diagram of one embodiment of the invention is illustrated in FIG. 1.

A speech unit 128 and/or a keypad 14 may be integrally coupled to a mobile structure 10 or may be part of mobile devices 36, fixed home or office computer systems 44, or other devices. Mobile devices 36 may include mobile telephones, personal digital assistants, digital radios, compact disk players, navigation systems, or other mobile devices. The mobile devices 36 may be configured to integrate with set-top boxes, alarm clocks, radios, or other electronic components. The speech unit 128 and/or keypad 14 may be interfaced to a Telematics Control Unit (TCU) 28 through one or more data interfaces 26. According to some embodiments, the main speech-processing unit 98 may be embedded in one or more TCU 28. In some embodiments, the components of the speech unit 128 may also be distributed between one or more TCUs.

A speech-processing unit may be built into mobile devices 36 and may be coupled with the data interfaces 26 though a wireless, or wired, handheld interface 20. Other user interface peripherals may be connected to the TCU through the data interfaces and may include displays 18, such as touch screen displays for displaying text, graphics and video; keypads 14 for receiving textual data input; video cameras 16 for receiving multimedia communications or conferences; a pointing device or stylus, or other user interface peripherals. Other devices may be connected to the TCU through the data interfaces including wide-area RF transceivers 24, navigation system components 22, or other devices. The navigation system may include several components such as, Global Positioning System (GPS) receivers or other radiolocation system receivers, gyroscopes or other inertial measurement equipment, distance measurement sensors, such as odometers, or other components. Radiolocation equipment may receive coded signals from one or more satellites or terrestrial sources 40. The one or more location service servers 48 may assist the navigation system. Other systems that can connect to the TCU through the data interfaces may include automotive control computers, digital control interfaces for devices such as media players or other electronic systems, measurement sensors, or other specialized electronic equipment.

The control and device interfaces 30 may connect the TCU 28 to various devices 32 within the mobile structure 10. The control and device interfaces 30 may be used to execute local or remote commands from users of the natural language interface. In some cases, the control and device interfaces 30 may include specialized hardware for interacting with different types of devices. The hardware interfaces may include analog or digital signal interfaces for device control, along with analog or digital interfaces for measurements that may control devices 32. These interfaces may also include specialized software that encapsulates or abstracts specific behavior of the devices 32. The interface software may include one or more drivers that are specific to the hardware interface and to one or more agents. The domain agents may include the specialized software behavior and data required to control a particular device or class of devices. New or updated behavior may be added to the system by updating data managers that are associated with specific devices or class of devices. The devices 32 may include manual controls or manual overrides 34. For safety reasons, the control and device interfaces 30 may incorporate fail-safe systems that, for example, may verify operating limits before changing settings, ensuring that commands do not conflict with settings from manual controls, and will not, in some combination with other commands or device settings, create an unsafe situation. The software behavior and data that ensures safe operations may be included within the domain agent that is specific to the device or class of devices. Examples of devices and system that can be controlled through the control and device interfaces 30 include, power management systems, measurement sensors, door locks, window controls, interior temperature controls, shifting of the transmission, turn signals, lights, safety equipment, engine ignition, cruise control, fuel tank switches, seat adjustments, specialize equipment such as winches, lifting systems or loading system, and other systems.

The wide-area RF transceiver 24 may communicate with one or more wide-area wireless networks 38, which may be connected to data networks 42, including the Internet, the Public Switched Telephone Network (PSTN) 42 or other data networks. The wide-area wireless networks can be of any suitable terrestrial or satellite based type. Mobile devices 36 may communicate with one or more local or wide-area wireless networks. Home or office systems 44, equipped with wired or wireless network interfaces, may communicate through the data networks or PSTN.

According to one embodiment of the invention, data and agents may be stored and synchronized in mobile structures 10, mobile devices 36 and/or fixed systems 44 having one or more main speech-processing units 98. The synchronization between these different systems can occur on the wide area wireless network 38, the data network 42, through the handheld interface 20, or other local data connections. The synchronization may be performed automatically when any two or more of the computers are connected to these networks. Alternatively, the synchronization may be performed on demand under user control. The synchronization process attempts to determine which version of a data element or an agent are the newest or most up-to-date and propagates that element. Thus, synchronization is an incremental change processes. In some cases, a complete replacement of a database, a portion of the database or of one or more agents may be performed rather than performing a series of incremental updates.

The wide-area wireless networks 38, the data networks 42 or PSTN, may connect mobile structures 10, mobile devices 36 and fixed computers 44 to one or more servers that provide one of more services. According to one embodiment of the invention, an interactive natural language user interface may be provided that supports a transfer of data or transmission of speech, text, video and other formats. For data centric applications, a standardized data transfer format may be used including, for example, Hypertext Markup Language over Hypertext Transfer Protocol (HTTP), Extensible Markup Language (XML), and other data formats or schemas, over HTTP or other transfer protocol, Electronic Data Interchange formats over a variety of transport protocols, etc. It will be understood that the exact configuration of the servers may be determined on a case-by-case basis with consideration being given to the exact combinations of services being offered, the service providers providing the services, the contractual relationships between the service provider, and other factors. The invention supports any suitable configuration. In each case these servers may themselves be distributed over one or more public or private networks. Some examples of servers that may be used to deliver these services, are given below:

1. One or more payment service providers 56 that supply payment capabilities to users. These payment services may include electronic wallet capabilities for one or more payment accounts and may include payment security information, payment account information, transaction histories, account balance information, and other information. Exemplary payment types include, stored value accounts, promotional accounts, credit accounts, telecommunications billing accounts, debit accounts, or other payment types that are accessed using online or offline methods. Payments can be computed in any manner including payment for a specific good or service, subscription payment, metered payment, or other payments. The payment services can be distributed in a number of ways. Examples of computers and servers used to store and process payment transaction information include, smart cards, main speech processing units 128, mobile devices 36, TCUs 28, fixed personal computers 44, payment gateways, payment servers 56, or other systems.

2. One or more Customer Relationship Management (CRM) systems 52 may supply any number of consumer and business customer services as discussed above. The CRM system can supply automated services or services that are partly or completely manual. For manual services one or more customer service representatives may use one or more service representative workstations 54. The CRM system and the service representative workstation may be connected to one or more data networks 42 or the PSTN. Any other servers may also have connections to one or more service representative workstations, which may be in common or independent of each other.

3. One or more specialized service servers 50 may support specialized consumer and business services.

4. One or more location service servers 48 may supply location information and location based services. The location data is used as a data input to the location services that may then be distributed in any suitable manner including, on main speech processing units 128, mobile devices 36, TCUs 28, fixed personal computers 44, other servers (i.e. 46, 50, 52, 56) or the one or more location services servers 48.

5. One or more emergency services servers 46 may supply both public and private emergency services to the users.

Main speech processing unit 98, speech unit 128 and keyboard 14 may be distributed in mobile devices 36 in a number of ways. For example, these units may be attached to the mobile devices 36 as independent components or as a single integrated component. In another embodiment of the invention, some or all of the main speech processing unit 98 and speech unit 128 may be embedded in one or more of the TCUs 28, mobile devices 36, fixed computer systems 44, or other devices.

Figure 2:
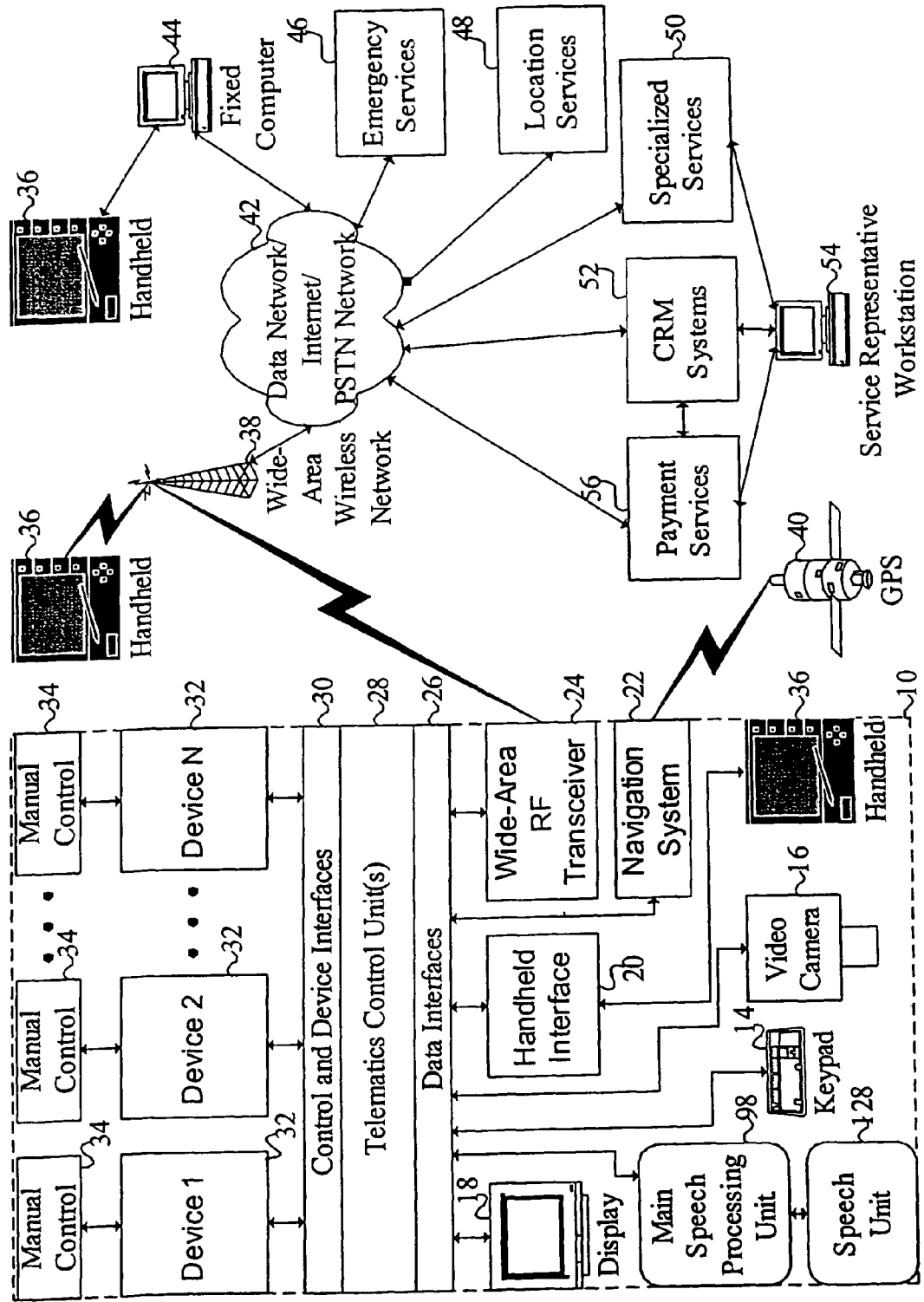
FIG. 2 is an overall block diagram of the system according to a second embodiment of the invention.

FIG. 2 illustrates an alternative block diagram of a second embodiment of the invention. In this embodiment, the main speech processing unit 98 and speech unit 128 are external to the TCU 28. These components may be housed in one or more packages or may be included in a single integrated package.

In all other respects, the second embodiment resembles the first embodiment illustrated in FIG. 1. It will be understood that the exact distribution and packaging of the main speech processing unit 98 and speech unit 128 may be determined by the details of the deployment situation and should not change the functionality, capabilities or spirit of the invention in any way.

Figure 3:
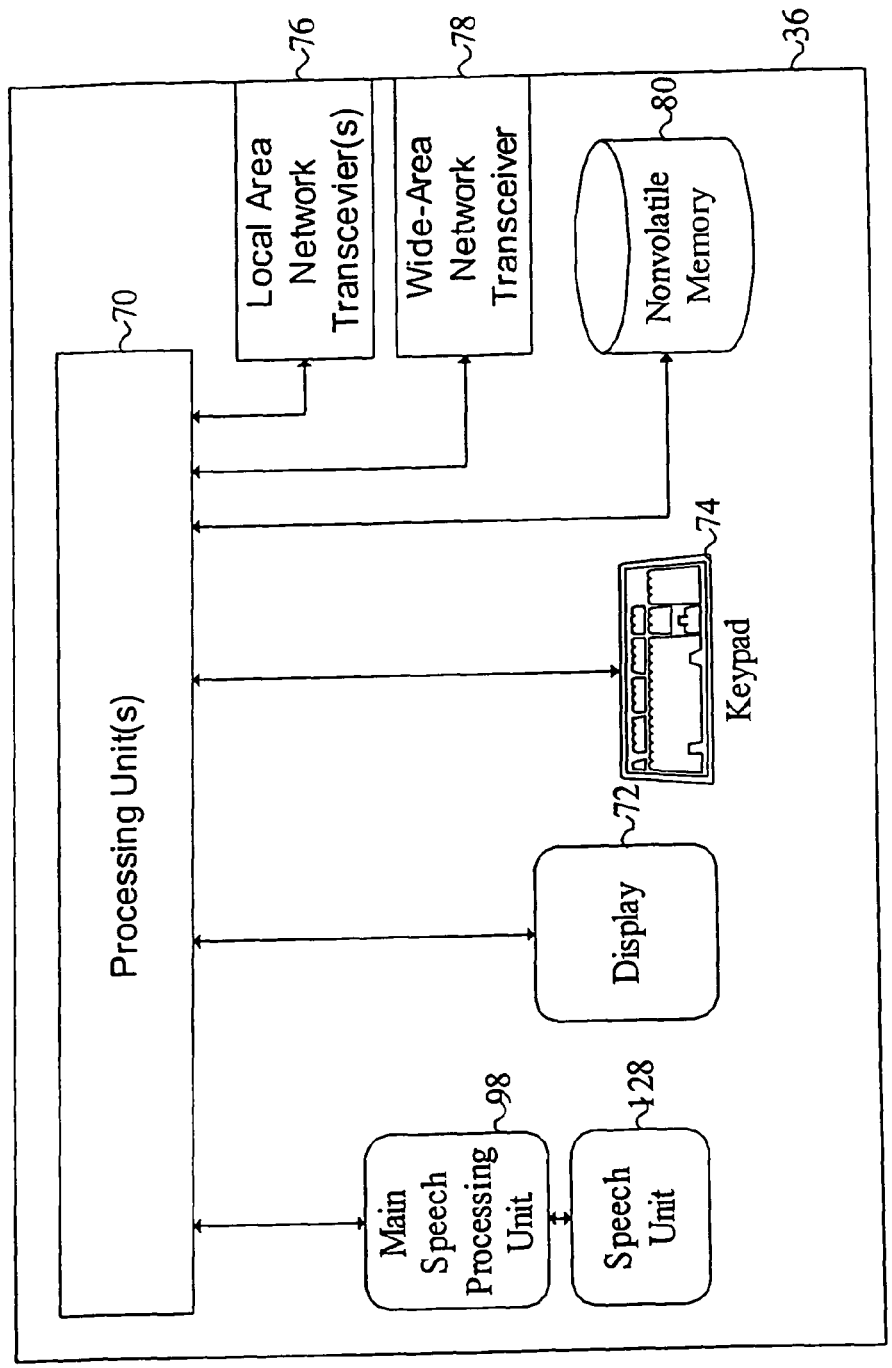
FIG. 3 is an overall block diagram of a mobile device according to an embodiment of the invention.

FIG. 3 illustrates a block diagram of one embodiment of the mobile devices 36 that include main speech processing unit 98 and speech unit 128 embedded in the mobile device 36, mobile telephone or other mobile device. The main speech processing unit may interface to one or more processing units 70 located in the mobile device 36. The processing units 70 may include one or more central processing units, one or more data and address busses, data interfaces, volatile memory, or other components. The processing units 70 may use one of more types of nonvolatile memory 80 for software and data storage. Suitable types of nonvolatile memory 80 may include flash memory and hard disk drives. In some embodiments, the main speech processing unit 98 may be integrated with the one or more processing units 70.

According to one embodiment, users may interact with the mobile device 36 through the speech unit 128, the keypad 74 or keyboard, a display 72 that displays text, graphics, video, or other peripheral. In some embodiments the display may be a touch screen type. Alternatively, a pointing device (not shown) may be used, among other devices.

The mobile device 36 may connect to one or more wired or wireless wide-area or local-area networks through one or more interfaces. A wide-area network transceiver 78 may connect to the wide-area wireless network 38 or the data network 42 using a wireless or wired connection, including an IP connection, a dial-up PSTN network connection or other connections. The local-area network transceiver 76 may connect to wired or wireless local area networks. These networks may include the handheld interface 20 or connections to fixed computer systems 44. In both mobile device environments and fixed computer environments, communications between humans and machines may not provide accurate results at least because natural language commands may be incomplete in their definition. The occurrence of inaccurate results may be reduced by leveraging context of previous utterances, knowledge of the domain and/or the user's history of interests and preferences or other factors.

Figure 7:
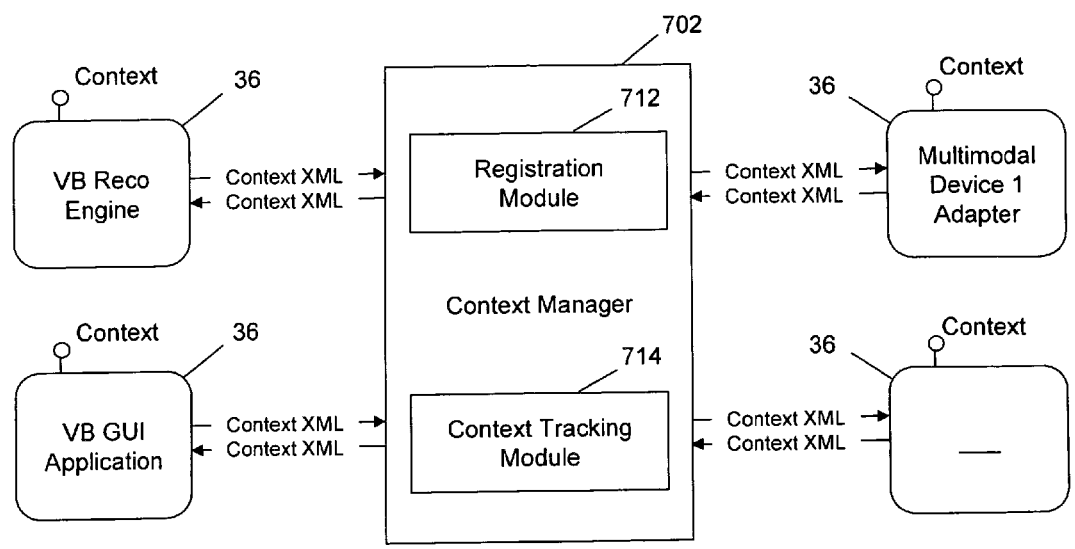
FIG. 7 illustrates a diagram for centrally maintaining context, according to one embodiment of the invention.

According to one embodiment of the invention, processing may be performed at the mobile devices 36. Alternatively, the processing may be performed on the server side. In yet another embodiment, the processing may occur on both the mobile devices 36 and the server side. The commands may be processed on-board the mobile devices 36 to enable the mobile devices 36 to control themselves and/or to control other mobile devices 36, fixed computers 44, mobile telephones, or other devices. Additionally, mobile devices 36 may track context. According to another embodiment of the invention illustrated in FIG. 7, a context manager 702 may be centrally maintained to allow input to and output from multiple mobile devices 36. Each of the mobile devices may communicate with the context manager 702 to register via registration module 712, wherein registration may indicate events that the mobile devices 36 may subscribe to. The context manager 702 may receive input in Context XML form, for example. The other registered mobile devices 36 may be informed of context changes through context tracking module 714, thereby synchronizing the context across the registered mobile devices 36. According to one embodiment of the invention, registered mobile devices 36 may be added or removed. The registered mobile devices 36 may be dynamic link libraries (DLLs), object code, or other data that may be specific to the mobile device 36.

According to yet another alternative embodiment of the invention, context information may be determined from a command or request that is presented as a text message and/or a command or request that is presented as a verbal utterance and processed using a multi-pass automatic speech recognition module that transcribes the verbal utterance to a text message. The multi-pass automatic speech recognition module may use a dictation grammar or a large vocabulary grammar, among other resources, to transcribe the verbal utterance into a text message. On platforms where a dictation grammar is not available, the multi-pass automatic speech recognition may use a virtual dictation grammar that uses decoy words for out-of-vocabulary words. Decoy words may include utility words, nonsense words, isolated syllables, isolated distinct sounds and other decoy words.

According to one embodiment of the invention, the text message may be searched for a particular character, group of characters, word, group of words, and other text combinations. The text combination may be compared against entries in a context description grammar that is associated with each agent 106. If a match is identified between an active grammar in the context description grammar and the command and/or request, then the match may be scored. The agents 106 may be ranked based on the determined score. In generating an aggregate response from the one or more responses received from the agents 106, the ordering of the responses from the individual agents may be determined based on the rank of agents 106. The aggregate response may be generated by a response generator module. Agents 106 may update a context stack, that includes an ordered list of command contexts, to enable follow-up requests.

According to another embodiment of the invention, if a match is not found, or only a partial match is found, between the text message and active grammars, then a knowledge-enhanced speech recognition system may be used to semantically broaden the search. The knowledge-enhanced speech recognition system may be used to determine the intent of the request and/or to correct false recognitions. The knowledge-enhanced speech recognition may access a set of expected contexts that are stored in a context stack to determine a most likely context. The knowledge-enhanced speech recognition may use context specific matchers that are able to identify context such as time, location, numbers, dates, categories (e.g., music, movies, television, addresses, etc.) and other context. The matching may be performed by comparing a character, group of characters, a word, group of words, and other text combinations. Alternatively, or in addition to text based matching, the matching may be performed using phonetic matching, among other techniques. The results of any match may be used to generate a command and/or request that is communicated to agents 106 for additional processing. According to one embodiment of the invention, non-speech interface 114 may show system, state and history information in a more concise manner than is possible through the speech interface. Non-speech interface 114 may be accessed to create or extend capabilities of agents 106. These operations may include scripting of agents, adding data to the agent or databases 102 used by the agent, adding links to information sources, among other operations.

According to another embodiment of the invention, mobile devices 36 may be configured to allow speech annotations of objects stored thereon. The objects may include photographs, calendar entries, email messages, instant messages, phonebook entries, voice mail entries, digital movies or other objects. Mobile devices 36 may transcribe the speech annotations to textual annotations and store the textual annotations with the object. Alternatively, mobile devices 36 may be configured to enable users to input non-speech annotations, such as textual descriptions, that are stored along with the objects.

According to one embodiment of the invention, the annotated objects may be stored on a server side, a client side, a combination of server side and client side, or according to other configurations. The invention further contemplates collaboratively exchanging and sharing the annotated objects among distributed workgroups that may include centralized servers having shared workspaces for providing common object storage and retrieval facilities. The shared workspaces may be implemented on the centralized servers and may be accessed from different platforms using the mobile devices 36. The system may include a peer-to-peer system for accessing the annotated objects.

According to one embodiment of the invention, the non-speech annotations may be classified and searched. In an alternative embodiment, the speech annotations may be classified and searched. However, classifying and searching speech annotations may be considerably more difficult than classifying and searching non-speech annotations.

According to another embodiment of the invention, the textual annotations and/or textual descriptions that are associated with the objects may be stored as metadata, thereby enabling searching for the objects using the metadata. The metadata may include GPS information, environmental information, geographic information, or other information. For example, proximity to famous landmarks may be determined using GPS information, environmental information, geographic information, or other information, and this information may be integrated into the metadata associated with the objects. According to one embodiment of the invention, GPS coordinates may be stored in the metadata associated with the objects and users may search for selected objects based on the GPS coordinates. A user may provide a speech command such as "show me all the photos of Greece." In this case, the system would limit the type of object to photographs and would determine the GPS coordinates of Greece. The system would then search the metadata for objects that correspond to photographs and that also satisfy GPS coordinates for Greece. According to another embodiment of the invention, including GPS coordinates in the metadata of objects enables post-processing of the objects based on the GPS coordinates. For example, the objects may be subjected to an initial sort based on generalized GPS coordinates that are stored in the metadata and may be subjected to additional sorting based on more particular criteria for the GPS coordinates. Thus, a user may initially search for object metadata that corresponds to a location near a famous landmark and may use image matching to label the objects with the searchable metadata (i.e., textual descriptions). For example, using the GPS coordinates stored in the metadata, users may first determine that photographs were taken at the Jefferson Memorial and may use this information to label the photographs with searchable metadata (i.e., textual descriptions) including "photo of the Jefferson Memorial." One of ordinary skill in the art will readily appreciate that metadata may include various types of information and may be searched using the various types of information.

According to one embodiment of the invention, the textual annotations may be communicated using a short message service on the mobile telephone or other device. Short message service is a text message service that enables sending and receiving of short textual messages. The textual messages may be stored at data centers for forwarding to intended recipients. Other configurations may be used.

According to another embodiment of the invention, the mobile devices 36 may support multi-modal communications that enable displaying of non-speech search results on a graphical interface and receipt of speech commands to provide a follow-up search, among other configurations. For example, the user may be presented with textual search results corresponding to a name of a famous person and the user may provide a speech command to find a biography of the famous person. The system may maintain the context of the textual search results to find the biography associated with the famous person. By contrast, known systems may perform a follow-up search on the term "biography" and may present a dictionary definition of the term "biography."

Figure 4:
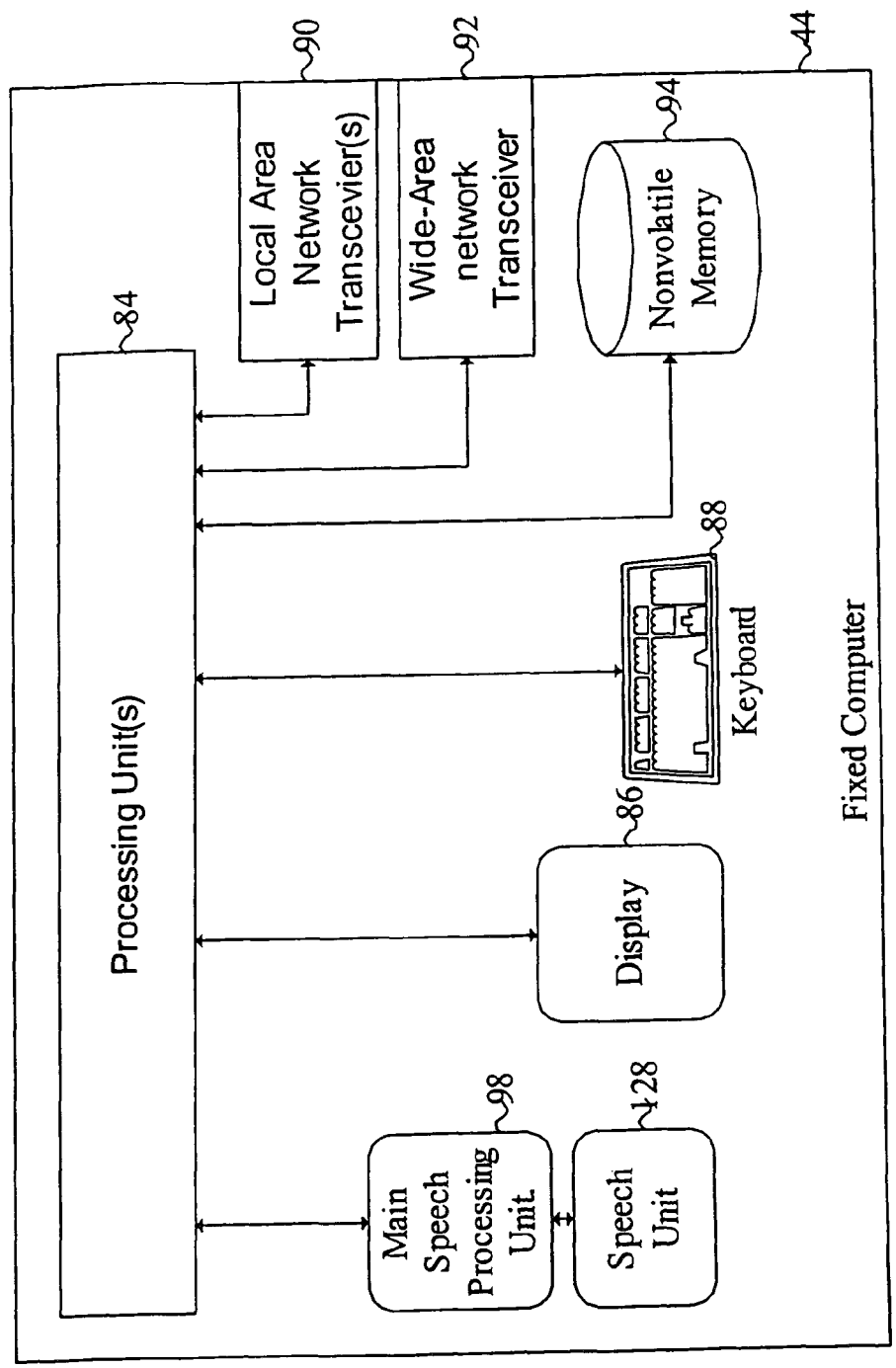
FIG. 4 is an overall block diagram of a fixed computer according to an embodiment of the invention.

FIG. 4 illustrates an embodiment that uses a fixed computer 44. In some embodiments, the main speech processing unit 98 and speech unit 128 may be embedded into the fixed computer 44. The main speech processing unit may interface with one or more processing units 84 that are associated with the fixed computer. The processing units may include one or more central processing units, one or more data and address busses, data interfaces, volatile memory, or other components. The processing unit may use one of more types of nonvolatile memory 94 for software and data storage. Suitable types of nonvolatile memory include, for example, flash memory and hard disk drives. In some embodiments, the main speech processing unit 98 may be integrated with the one or more processing units 84. According to one embodiment of the invention, processing may be performed at the fixed computers 44. The commands may be processed on-board to enable the fixed computers 44 to control themselves and/or to control other fixed computers 44, mobile devices 36, mobile telephones, or other devices. Additionally, fixed computers 44 may track context as described above.

According to another embodiment of the invention, fixed computers 44 may be configured to allow verbal annotations of objects stored thereon. Fixed computers 44 may transcribe the verbal annotation to text and store the textual annotation with the object. Alternatively, fixed computers 44 may be configured to enable users to manually input textual descriptions that are stored along with the objects. According to one embodiment of the invention, the textual annotations and/or textual descriptions may be classified and searched. In an alternative embodiment, fixed computers 44 may classify and search the verbal annotations rather than textual annotations. However, classifying and searching verbal annotations may be considerably more difficult than classifying and searching textual annotations and/or textual descriptions.

In another embodiment of the invention, users may interact with fixed computers 44 using speech unit 128, the keyboard 88 or keypad, a display 86 for displaying text, graphics, video, or other peripherals. According to some embodiments of the invention, the display may be a touch screen type. Alternatively, a pointing device (not shown) may be used, along with other devices. Fixed computers 44 may be coupled to one or more wired or wireless wide-area or local-area networks through one or more interfaces. A wide-area transceiver 92 may connect to the wide-area wireless network 38 or the data network 42, using a wireless or wired connection, including an IP network, a dial-up PSTN network connection, or other connections. The local-area network transceiver 90 may connect to wired or wireless local area networks. These networks may include connections to mobile devices 36.

In order for devices to properly respond to requests and/or commands that are submitted in a natural language form, machine processable requests and/or algorithms may be formulated after the natural form questions or commands have been parsed and interpreted. Algorithms describe how the machines should gather data to respond to the questions or commands. Depending on the nature of the requests or commands, there may not be a simple set of requests and/or algorithms that will return an adequate response. Several requests and algorithms may need to be initiated and even these requests and algorithms may need to be chained or concatenated to achieve a complete response. Further, no single available source may contain the entire set of results needed to generate a complete response. Thus, multiple requests and/or algorithms, perhaps with several parts, may be generated to access multiple data sources that are located both locally or remotely. Not all of the data sources, requests and/or algorithms may return useful results or any results at all. Useful results that are returned are often embedded in other information and may need to be extracted from the other information. For example, a few key words or numbers may need to be "scraped" from a larger amount of other information in a text string, table, list, page, video stream or other information. At the same time, extraneous information including graphics or pictures may be removed to process the response. In any case, the multiple results must be evaluated and combined to form the best possible response, even in cases where some requests do not return useful results or fail to produce results entirely. In cases where the command is determined to be ambiguous or the result is inherently subjective, determining the results to present in the response is a complex process. Finally, to maintain a natural interaction, responses should be returned to the user rapidly. Managing and evaluating complex and uncertain requests, while maintaining real-time performance, is a significant challenge.

The invention provides a complete speech-based command generation, information query, retrieval, processing and presentation environment or a combination of speech-based and non-speech-based command generation, information query, retrieval, processing and presentation environment for telematic applications. In addition, the invention may be useful for controlling the system itself and/or external devices. This integrated environment makes maximum use of context, prior information and domain and user specific profile data to achieve a natural environment for one or more users submitting requests or commands in multiple domains. Through this integrated approach, a complete speech-based natural language command, algorithm and response environment or a combination of speech-based and non-speech-based command, algorithm and response environment may be created.

The telematic natural language interface may be deployed as part of, or a peripheral to a TCU or other mobile devices 36, as part of a mobile device interfaced to vehicle computers and other mobile system through wired, wireless, optical, or other types of connections or fixed computers interfaced to the vehicle computers or other systems through a combination of wired, wireless, optical and/or other types of connections. Alternatively, the components of the interactive natural language telematic interface may be distributed in any suitable manner between these multiple computing platforms.

Figure 5:
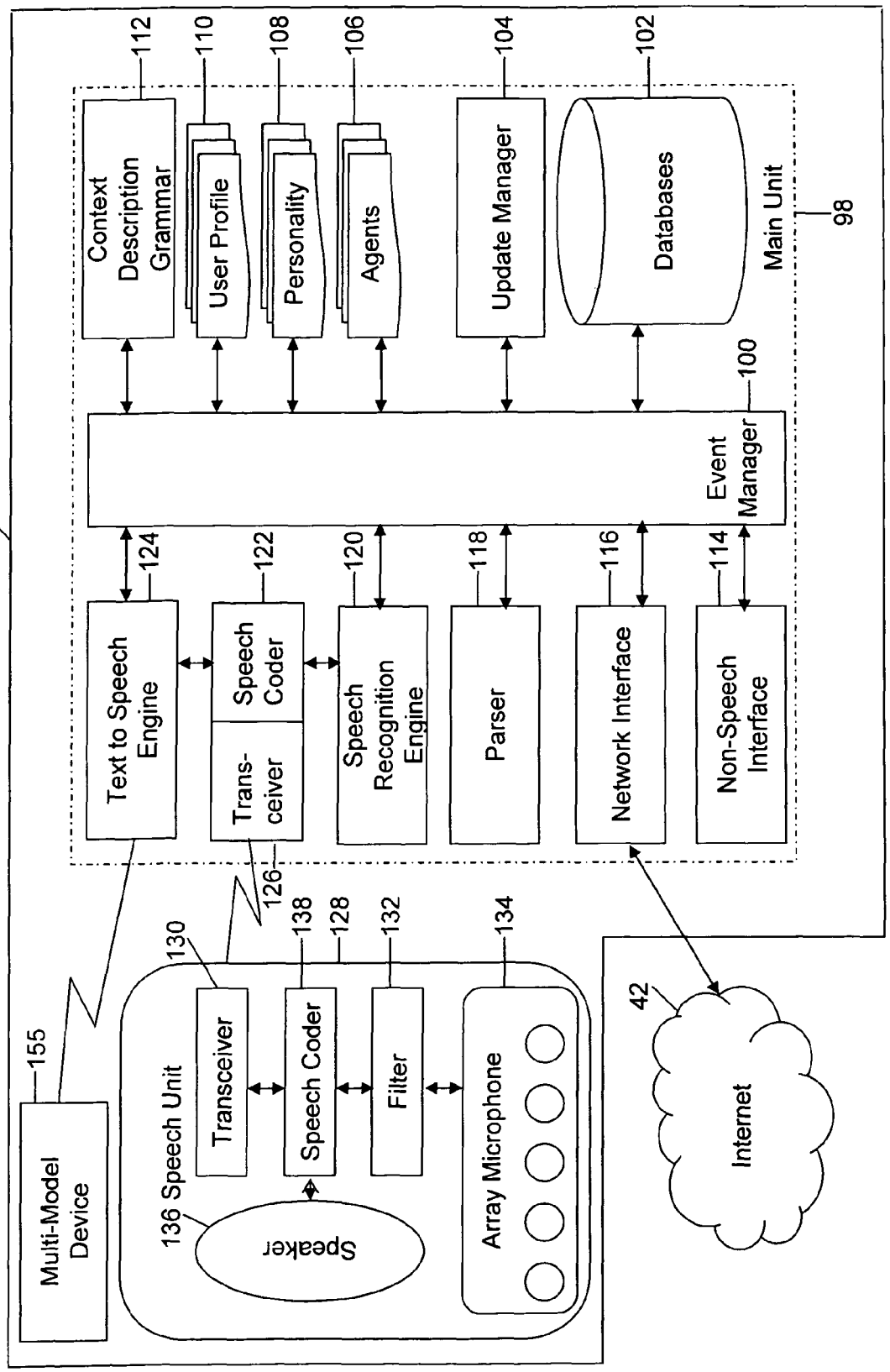
FIG. 5 is an overall diagrammatic view of the interactive natural language processing system according to an embodiment of the invention.

FIG. 5 illustrates one exemplary schematic diagram view of a system 90 according to an embodiment of the invention. The system 90 may include a main unit 98, speech units 128, and multi-modal devices 155. In an alternative embodiment, the system 98 may include completely separate systems for main unit 98, speech units 128 and multi-modal devices 155. The event manager 100 may mediate interactions between components of main unit 98. The event manager 100 provides a multi-threaded environment allowing the system 98 to operate on multiple commands or questions from multiple user sessions, without conflict, and in an efficient manner to maintain real-time response capabilities.

Figure 8:
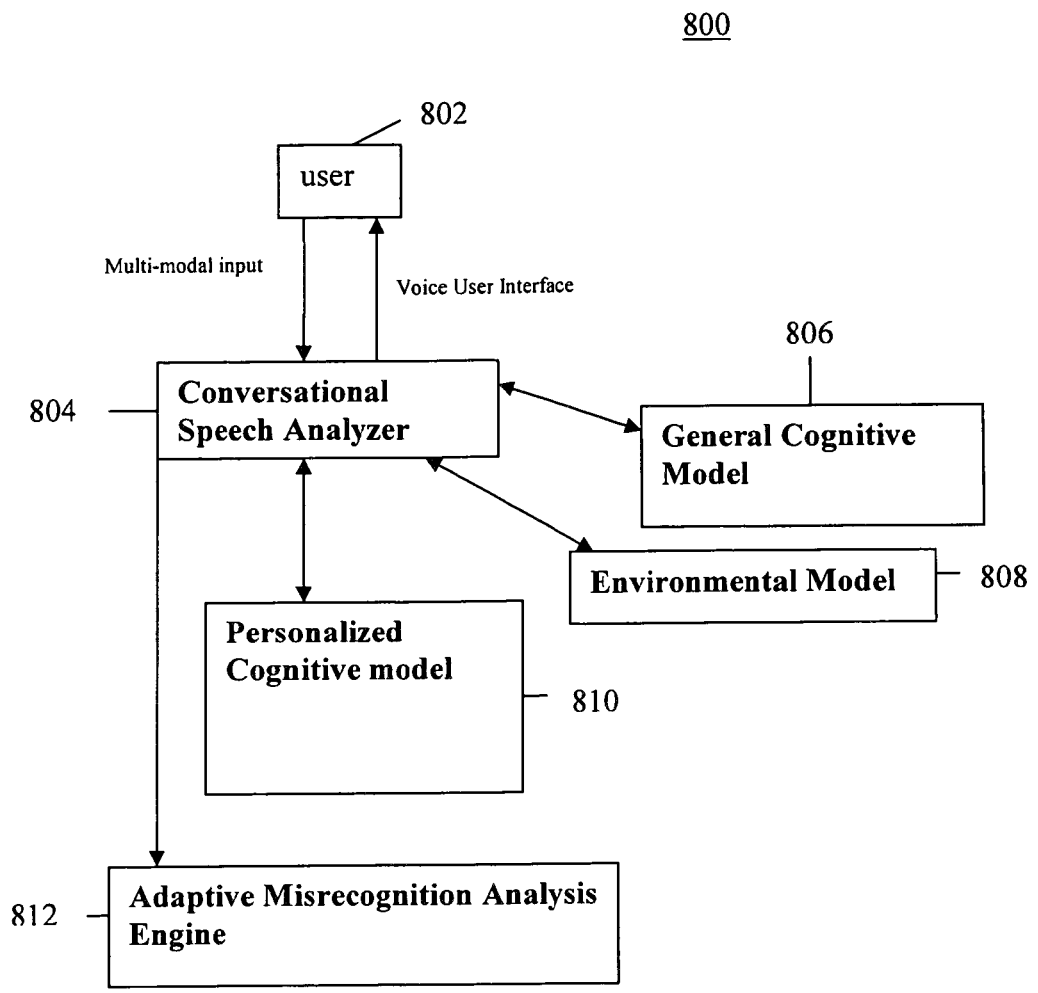
FIG. 8 illustrates a system diagram for an enhanced conversational voice user interface according to one embodiment of the invention.

FIG. 8 illustrates one exemplary embodiment of an enhanced conversational user interface 800 that receives multi-modal input from users 802 and communicates with a conversational speech analyzer 804. The conversational speech analyzer 804 may be coupled to several components, including a general cognitive model 806, an environmental model 808, a personalized cognitive model 810, and an adaptive misrecognition analysis engine 812 or other components. According to one embodiment of the invention, the conversational speech analyzer 804 may include one or more speech recognition engines that transcribe utterances to textual messages. The transcription may be performed using one or more conversational grammars, a context description grammar 112, or other transcription methods. According to one embodiment of the invention, data that is entered in a text format may be merged with data that is transcribed to a textual format from the utterance. Conversational speech analyzer 804 also may include a semantic knowledge-based model that analyzes the textual message and detects command components.

According to one embodiment of the invention, personalized cognitive model 810 is a model derived from a user's interaction pattern with the system and may be used to predict what actions the user may take next in time, thus assisting with speech recognition and/or question or command recognition. Personalized cognitive model 810 may track actions performed by the user. When the system is attempting to predict user behavior, the personalized cognitive model may be consulted first. The system may have multiple personalized cognitive models, wherein one may correspond to each user.

According to another embodiment of the invention, general cognitive model 806 is a statistical abstract that corresponds to interaction patterns with the system for multiple users. Data stored within general cognitive model 806 may be used to predict a user's next action, thus assisting with speech recognition and/or question or command recognition. The general cognitive model 806 may also track what actions a particular user has performed and may be used when the user interacts with the system in a way that is not handled in the personalized cognitive model.

According to one embodiment of the invention, the environmental model 808 may include information associated with the user's environment and surroundings. The information may include the type of environment that a user is in (e.g., quiet or noisy); details of a microphone and/or speaker system; the user's current global position and movement, as may be determined by GPS; current system status, such as what song/movie is playing, is the system in the midst of retrieving something, or other system status; details on all voice-enabled devices in the immediate vicinity, such as a presence of a voice-enabled TV, stereo, and DVD player in the same room; a user's credit card information, such as numbers and current balances, wherein the user may ask a mobile telephone to download and pay for a video and the system may respond that there are insufficient funds; or other information. The information may be accessed to invoke a context, domain knowledge, preferences, and/or other cognitive qualities that enhance the interpretation of questions and/or commands.

The conversational speech analyzer 804 may also access the general cognitive model 806 and/or the personalized cognitive model 810 to further refine a context, domain knowledge, preferences, and/or other cognitive qualities to enhance the interpretation of questions and/or commands. Based on information received from general cognitive model 806, environmental model 808 and/or the personalized cognitive model 810, the system may enhance responses to commands and questions by including a prediction of user behavior.

Adaptive Misrecognition Analysis Engine 812 may analyze and store textual messages, including transcribed utterances, that are identified as being unrecognized or incorrectly recognized by conversational speech analyzer 804. Upon a determination that text is unrecognized, the system may generate an unrecognized event. For example, an unrecognized event may result from not finding a match to text and/or the transcribed utterance.

According to one embodiment of the invention, the system may implement one or more techniques to determine that textual messages are incorrectly recognized. For example, the user may command the system to play a specific song title and the system may misrecognize the requested song title and provide a song having a different title, the system may misrecognize an incorrect song title and provide a song having a different than requested title, the system may misrecognize a correct song title and provide a song having an invalid song title, among other variations. When the system misrecognizes a request, the user typically provides immediate feedback such as, overriding the command in a time shorter than the expected execution time of the command, repeating the original request, issuing a stop command, or taking other action, wherein the action may be presented verbally, non-verbally by pushing a selected button on a cell phone or remote control, or both, among other configurations. According to one embodiment of the invention, the system may detect the user action and may prompt the user to re-phrase the request to enable the system to modify words in the query. The user's actions may be analyzed in a statistical model to determine a frequency occurrence of misrecognitions for particular commands, with the results being used to update the corresponding personalized cognitive model 810.

According to another embodiment of the invention, the conversational speech analyzer 804 may access the personalized cognitive model 810 to proactively select a next best (or nth best) match for the received text. A match may be confirmed by user action that include the user not immediately canceling the command or taking other action. The misrecognitions may also be analyzed to potentially determine personalized tuning parameters for the speech recognition components of the system. For example, the system may, over time, tune the speech recognition engine to increase recognition by analyzing how the speech recognition engine misrecognizes the utterance.

The event manager 100 may mediate interactions between other components of the invention. The event manager can provide a multi-threaded environment allowing the system to operate on multiple commands or questions from multiple user sessions without conflict and in an efficient manner, maintaining real-time response capabilities.

Agents 106 may include a collection of grammars, criteria handlers, and algorithms that are accessible to respond to a set of requests and/or commands. Agents 106 may further contain packages of both generic and domain specific behavior for the system 98. Agents 106 may use nonvolatile storage for data, parameters, history information, and locally stored content provided in the system databases 102 or other local sources. One or more user profiles 110 may be provided that include user specific data, parameters, and session and history information for determining the behavior of agents 106. One or more personality modules 108 may be provided in a data determining system that include personality characteristics for agents. The update manager 104 manages the automatic and manual loading and updating of agents 106 and their associated data from the Internet 146 or other network through the network interface 116.

According to one embodiment of the invention, the speech-based interface for the system 90 may include one or more speech units 128. Speech units 128 may include one or more microphones, for example array microphone 134, to receive the utterances from the user. The speech received at the microphone 134 may be processed by filter 132 and passed to the speech coder 138 for encoding and compression. In one embodiment, a transceiver module 130 may transmit the coded speech to the main unit 98. Coded speech received from the main unit 98 is detected by the transceiver 130, then decoded and decompressed by the speech coder 138 and annunciated by the speaker 136.

According to one embodiment of the invention, the non-speech-based interface for the system 90 may include one or more multi-modal devices 155 that may include mobile devices, stand alone or networked computers, personal digital assistances (PDAs), portable computer devices, or other multi-modal devices.

The speech units 128, multi-modal devices 155 and the main unit 98 may communicate over a communication link. The communication link may include a wired or wireless link. According to one embodiment, the communication link may comprise an RF link. The transceiver 130 on the speech unit may communicate coded speech data bi-directionally over the communication link with the transceiver 126 on the main unit 98. According to another embodiment, the RF link may use any standard local area wireless data protocols including the IEEE 802.11, Bluetooth or other standards. Alternatively, an infrared data link conforming to any suitable standard such as IrDA or other infrared standards can be used. In an alternative embodiment, wires may connect the speech unit 128 and the main unit 98, eliminating the need for one speech coder 138. Other wired or wireless analog or digital transmission techniques can be used.

According to one embodiment of the invention, coded speech received at the transceiver 126 on the main unit 98 is passed to the speech coder 122 for decoding and decompression. The decoded speech may be processed by the speech recognition engine 120 using the context description grammar module 112, among other information. Any recognized information may be processed by the parser 118, which transforms information into complete algorithms and questions using data supplied by knowledge agents. Knowledge agents may be selected from the plurality of agents 106 using a grammar stack, wherein the knowledge agents provide information for generating a response to the question or command. The knowledge agents may then process the commands or questions by creating requests that are submitted to local databases 102 or submitted through the network interface 116 to external data sources over the Internet 146 or external other networks. Algorithms typically result in actions taken by the system 90 itself (i.e., pause or stop), or to a remote device or data source (i.e., download data or program, or control a remote device), through the network interface to the Internet or other data interface.

According to one embodiment of the invention, knowledge agents may return results of questions as responses to users. The responses may be created using the results of information requests, the system personality 108, the user preferences, other data in the user profile 110, and/or other information. Agents 106 may present these results using the speech unit 128. The agents 106 may create a response string, which is sent to the text to speech engine 124. The text to speech engine 124 may generate the utterances, which may be encoded and compressed by the speech coder 122. Once coded, the utterances are transmitted from the main unit 98 by the transceiver 126 to the transceiver 130 on the speech unit 128. The utterance is then decoded and decompressed by the speech coder 138 and output by the speaker 136. Alternatively, agents 106 may present the results using multi-modal devices 155.

The non-speech interface 114 may be part of, or separate from, the multi-modal devices 155 and may be used as a substitute or complement to the speech interface. For example, non-speech interface 114 may be used to present and interact with non-speech (e.g., graphical or tabular) information in a manner more easily understood by the user. According to one embodiment of the invention, multimodal support may be provided to maintain the context during both voice interaction and interaction through the non-speech interface 114. In one exemplary embodiment, a communication channel may be opened between multimodal devices 155 and the main user interface system 90 to allow multimodal devices 155 to input text commands and questions. According to another embodiment of the invention, multimodal devices 155 may send a string of text or keywords for a command or question. The main interface system 90 may synchronize the context between multimodal device 155 and the speech units 128. In order to send a response to the corresponding device, the main user interface system 90 may track where the input came from so that the response may be sent to a TTS or multi-modal device 155.

According to one embodiment of the invention, non-speech interface 114 may show system, state and history information in a more concise manner than is possible through the speech interface. Non-speech interface 114 may be accessed to create or extend capabilities of agents 106. These operations may include scripting of agents, adding data to the agent or databases 102 used by the agent, adding links to information sources, among other operations.

Figure 6:
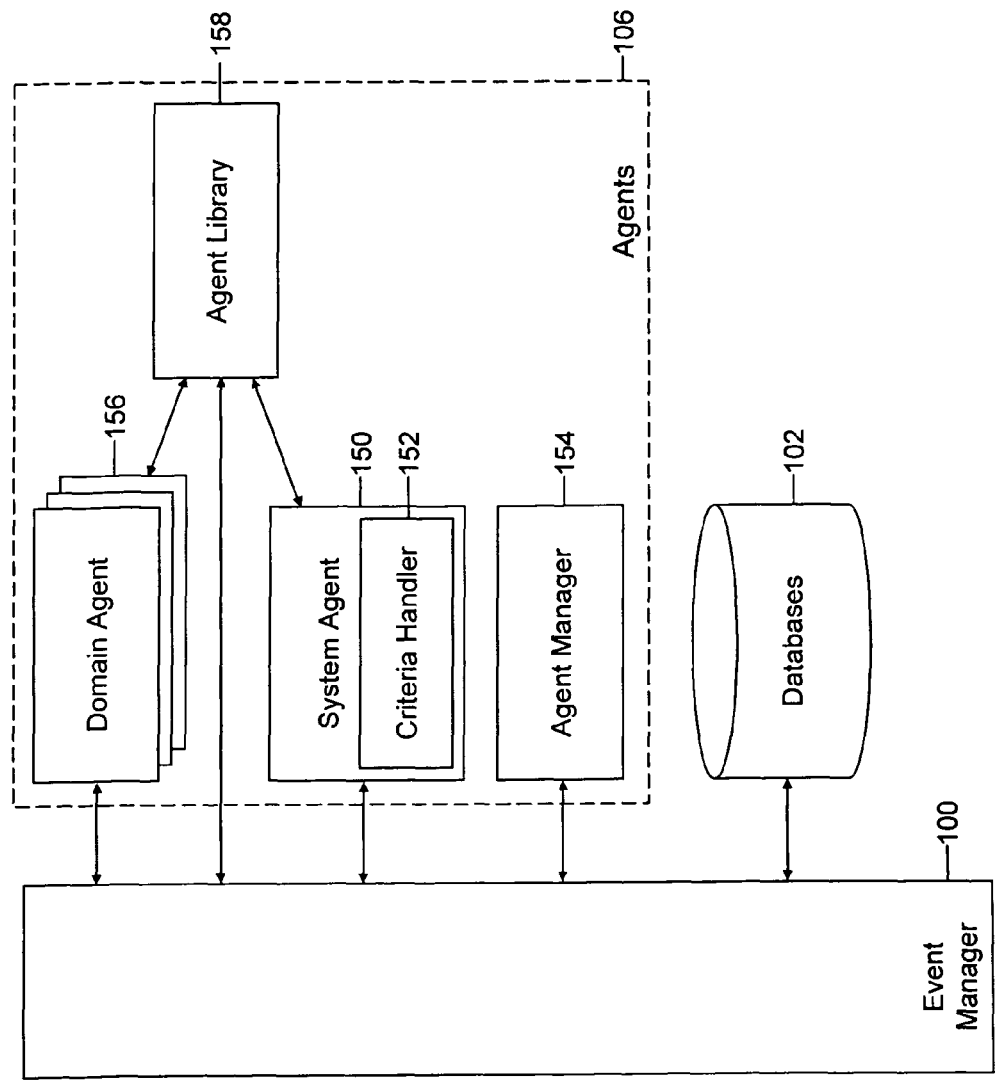
FIG. 6 is a schematic block diagram showing the agent architecture according to an embodiment of the invention.

According to another embodiment of the invention, system 90 may include different types of agents 106. In some embodiments of the invention, generic and domain specific behavior and information may be organized into domain agents 156. The system agent, on the other hand, may provide default functionality and basic services. The domain specific agents may provide complete, convenient and re-distributable packages or modules for each application area. In other words, the domain agents may include data that is needed to extend or modify the functionality of the system 90 in a current or new domain. Further, domain agents and their associated data can be updated remotely over a network as new behavior is added or new information becomes available. Domain agents may access a plurality of sources that may provide various services. Domain agents may use the services of other, typically more specialized, data managers and system agent. Agents are distributed and redistributed in a number of ways including on removable storage media, transfer over networks or attached to emails and other messages. The invention may provide license management capability allowing the sale of data managers by third parties to one or more users on a one time or subscription basis. In addition, users with particular expertise can create data managers, update existing data managers by adding new behaviors and information and making these data managers available to other users. A block diagram of the agent architecture according to an embodiment of the invention is shown in FIG. 6.

Agents 106 may receive and return events to the event manager 100. Both system agents 150 and domain agents 156 may receive questions and commands from the parser 118. Based on keywords in the questions and commands and the structures of the questions and commands, the parser may invoke selected agents. Agents use the nonvolatile storage for data, parameters, history information and local content provided in the system databases 102.

According to one embodiment of the invention, when the system starts-up or boots-up, the agent manager 154 may load and initialize the system agent 150 and the one or more domain agents 156. Agent manager 154 includes knowledge of agents 106 and maps agents 106 to the agent library 158. At shutdown, the agent manager may unload the agents 106. The agent manager 154 also performs license management functions for the domain agents 156 and content in the databases 102.

The system agent 150 manages the criteria handlers 152 that handle specific parameters or values (criteria) used to determine context for questions and commands. According to one embodiment of the invention, criteria handlers 152 include parsing routines that are specialized to recognize particular parts of speech, such as times, locations, movie titles, and other parts of speech. The criteria handlers 152 may identify matching phrases and extract semantic attributes from the phrases. Both the system agent 150 and the domain agents 156 may use the criteria handlers 152. The various domain agents 156 may use the services of the system agent 150 and of other, typically more specialized, domain agents 156. The system agent 150 and the domain agents 156 may use the services of the agent library 158, which contains utilities for commonly used functions. According to one embodiment of the invention, the agent library may be a dynamic link library that implements one or more agents. The agent library may include utilities for text and string handling, network communications, database lookup and management, fuzzy and probabilistic evaluation, text to speech formats, and other utilities.

Domain agents 156 may be data-driven, scripted or created with compiled code. A base of generic agent may be used as the starting point for data-driven or scripted agents. Agents created with compiled code are typically built into dynamically linkable or loadable libraries. Developers of agents can add new functionality to the agent library 158 as required. Details of agent distribution and update, and agent creation or modification are discussed in sections below.

According to another embodiment of the invention, capabilities are provided to distribute and update system agents 150, domain agents 156, agent library 158 components, databases 102, and context description grammar 112 over wireless or wired networks 136, including IP networks and dial-up networks using the update manager 104. The network interface 116 may provide connections to one or more networks. The update manager 104 may also manage the downloading and installation of core system updates. The agent manager 154 may perform license management functions for the domain agents and the databases. The update manager 104 and agent manager 154 may perform these functions for all agents and database content including, agents and content available to all users or agents and/or content available to selected users. Examples of agent and database components added or updated on a periodic basis include:

agents for new domains;
additional domain knowledge for agents;
new keywords for a domain, which can include names of politicians, athletes, entertainers, names of new movies or songs, etc. who have achieved recent prominence;
links to a preferred set of information sources for the domains covered including links for, entertainment, news, sports, weather, etc.;
updates to domain information based on, for example, changes to tax laws, company mergers, changing political boundaries;
updates to content, including dictionaries, encyclopedias and almanacs; and
other content and database components.

When a user requires or selects a new domain agent 156 or database element 102, the update manager 104 may connect to their source on the network 146 though the network interface 116, download and install the agent or data. To save system resources and to comply with any license conditions, the update manger 104 may uninstall agents that are no longer in use. In one embodiment of the invention, the update manager 104 may periodically query one or more sources of the licensed agents and database components to locate and download updates to agent executables, scripts or data as they become available. Alternatively, the agent sources may initiate the downloading of agent updates of the registered or licensed agents to the update manager as they become available.

The agent manager 154 may provide license management clients that are capable of executing most any license terms and conditions. When a particular agent 106 and/or database element 102 is selected based on a submitted command, the agent manager 154 verifies that the use of the agent or data element is within the allowed terms and conditions, and if so, invokes the agent or allows access to the data element. License management schemes that can be implemented through the agent manager 154 include outright purchase, subscription for updates, one time or limited time use. Use of shared agents and data elements (such as those down-loaded from web sites maintained by groups of domain experts) may also be managed by the agent manager 154.

If questions or commands do not match an agent that is currently loaded on the system, the agent manager 154 may search the network 146 through the network interface 116 to find a source for a suitable agent. This process may be triggered, for example, when a query is made in a domain for which an agent is not available, when a new device is added to a mobile structure, or when the behavior of a mobile device is updated. Once located, the agent can be loaded under the control of the update manager 104, within the terms and conditions of the license agreement, as enforced by the agent manager.

New commands, keywords, information, or information sources can be added to any domain agent 156 by changing agent data or scripting. These configuration capabilities may allow users and content developers to extend and modify the behavior of existing domain agents 156 or to create new domain agents 156 from a generic agent without the need to create new compiled code. Thus, the modification of the domain agents 156 may range from minor data-driven updates by even the most casual users, such as specifying the spelling of words, to development of complex behavior using the scripting language as would typically be done by a domain expert. The user can create and manage modifications to domain agents 156 through speech interface commands or using non-speech interface 114. User-specific modifications of domain agents 156 are stored in conjunction with the user's profile 110 and accessed by the domain agent 156 at run-time.

The data used to configure data driven agents 156 may be structured in a manner to facilitate efficient evaluation and to help developers with organization. This data is used not only by the agent, but also in the speech recognition engine 120, the text to speech engine 124, and the parser 118. Examples of some major categories of data include:

1. Content packages may include questions or commands. Each command or question or group of commands or questions may include contexts used for creation of one or more requests. The domain agent 156 may pass a context description grammar expression to the parser 118 for evaluation of a context or question. An initial or default context is typically supplied for each command or question. The command or question includes a grammar for the management and evaluation of the context stack.
2. Parameters and other operating data on devices that are under control of the natural language speech interface. The domain agent 156 may use this data and parameters to determine how to execute a command, how to formulate the command string for the parser 118, determine if the command is feasible, and determine if the command can be executed within safety and operating limits.
3. Page lists or pointers to other local or network content sources. For each page or content source, there may be a pointer (e.g. URL, URI, or other pointer) to the page or source. Each page may have specific scraping information used to extract the data of interest. The scraping information may include, for example, matching patterns, HTML or other format parsing information.
4. A response list, determining the response of the domain agent 156 to a particular command or question given the context, the user profile and the information retrieved. Responses may include diagnostic error messages or requests for more information if the question or command cannot yet be resolved from the known information. Responses can be based on or be dependent on thresholds or probabilistic or fuzzy weights for the variables.
5. Substitution lists that include variable substitutions and transformations, often applied by the agents 150, 156 in the formatting of requests and results. For example, a stock domain specific agent 156 would use a substitution list of company trading symbols, company names and commonly used abbreviations. Substitutions and transformations can be performed on commands and questions to create precise queries, which can be applied against one or more information sources or to results for creating more meaningful output to the user. Substitution lists also include information for optimally dealing with structured information, such as HTML formatted page parsing and evaluation.
6. Personalities used for responses. Personalities can be constructed by combining multiple traits in a weighted manner. Weights can be specified for each agent's domain area to create one or more specific personalities. Examples of personality traits include, sarcasm, humor, irritation, and sympathy, and other traits.
7. Public and user specific parameters for sources, substitutions, transformations, variables or criteria. The public parameter lists are part of the agent package 156. The user specific parameters are included in the user profile 110.

Commands and questions are interpreted, requests formulated, responses created and results presented can be based on the user's personal or user profile 110 values. Personal profiles may include information specific to the individual, their interests, their special use of terminology, the history of their interactions with the system, domains of interest, or other factors. The personal profile data can be used by the agents 106, the speech recognition engine 120, the text to speech engine 124, and the parser 118. Preferences can include, special (modified) commands, past behavior or history, questions, information sources, formats, reports, alerts or other preferences. User profile data can be manually entered by the user and/or can be learned by the system based on user behavior. User profile values can include: 1) spelling preferences; 2) date of birth for user, family and friends; 3) income level; 4) gender; 5) occupation; 6) location information such as, home address, neighborhood, and business address, paths traveled, locations visited; 7) vehicle type or types; 8) vehicle operator certifications, permits or special certificates; 9) history of commands and queries; 10) telecommunications and other service providers and services; 11) financial and investment information; 12) synonyms (i.e., a nick name for someone, different terms for the same item); 13) special spelling; 14) keywords; 15) transformation or substitution variables; 16) domains of interest; or, 17) other values.

End users may use the data driven agent 156 extension and modification facilities and values stored in user profiles 110 to create special reports, packages of queries, alerts and output formats. A single alert or report can be configured to use multiple data sources and other variables (i.e., time, location, measured value) value to determine when alerts should be sent. For example, an alert can be generated by sampling a stock price every 15 minutes and sending an alert if the price drops below some value. In another example, an alert may be generated when a particular condition or combination of conditions occur for the vehicles. Alerts and reports can be directed to a local or remote output.

To create a report, the user may first specify a set of commands or questions. Next, the user can create or select a format for the report. Finally the user may name the report. A report can have variable parameters. For example, a user may create a company stock report and execute the report by stating its name and the company name, which gives the user selected information in a specified format for that company. In another example, a user can create a "morning" report, which presents selected multimedia information from different sources (news, sports, traffic, weather) in the order and formats desired. In yet another example, the user can create a report on the status of one or more vehicle systems. Alerts and reports can be created using only voice commands and responses, commands and responses through the graphical user interface 114, or a combination of the two. Reports can be run locally or remotely with respect to the vehicle. To create a report, alert, or other specialized behavior, the user performs a number of steps including: 1) specifying the command to run a report or alert; 2) specifying the question or questions, including keywords, used for a query; 3) setting the criteria for running the report such as on command or when a particular condition is met; 4) defining preferred information sources; 5) defining preferences for order of result evaluation by source, value, and other parameters; 6) specifying the presentation medium for a report or alert, such as an email, the text to speech engine, a message to a pager, or a text and graphics display; and, 7) specifying the preferred format for the report, such as information to be presented, order of information to be presented, preferred abbreviations or other variable substitutions.

Filtering and noise elimination may be important in facilitating the various functionalities of system 90 and may improve operation in noisy mobile environments. Recognition and parsing of the user's speech is implemented with good signal to noise ratio at the input to the speech recognition engine 120. To provide acceptable results, a set of acoustic models, an array microphone 134, a filter 132, or other components, may be employed. If a good signal to noise ratio cannot be achieved, a noise identification algorithm may be used and the appropriate acoustic model, for example, one that has been trained in conditions similar to the identified noise, may be selected. According to one embodiment of the invention, the microphone array, filters and speech coder 138 are physically separated from the main unit 98 into a speech unit 128, and connected using a wireless link. Since bandwidth on a wireless connection is at a premium, the speech coder dynamically adapts the digitization rate and compression of the captured speech.

Some embodiments of the invention may use one or more arrays of microphones 134 to provide better directional signal capture and noise elimination than can be achieved with a single microphone. The microphone array can be one-dimensional (a linear array) or two-dimensional (a circle, square, triangle or other suitable shape). The beam pattern of the array can be fixed or made adaptive though use of analog or digital phase shifting circuitry. The pattern of the active array is steered to point in the direction of the one or more users speaking. At the same time, nulls can be added to the pattern to notch out point or limited area noise sources. The use of the array microphone also helps reduce the cross talk between output from the text to speech engine 124 through the speaker 136 or from another user talking and detection of the user's speech.

The invention may use an analog or digital filter 132 between the array microphone or conventional microphone 134 and the speech coder 138. The pass band of the filter can be set to optimize the signal to noise ratio at the input to the speech recognition engine 120. In some embodiments, the filter is adaptive, using band shaping combined with notch filtering to reject narrow-band noise. One embodiment employs adaptive echo cancellation in the filter. The echo cancellation helps prevent cross talk between output from the text to speech engine and detection of the user's speech as well as suppression of environmentally caused echoes. Algorithms comparing the background noise to the signal received from the users speech may be used to optimize the band-shaping parameters of the adaptive filter.

The speech received by the array microphone 134 and passed through the filter 132 may be sent to the speech digitizer or coder 138. The speech coder may use adaptive lossy audio compression to optimize bandwidth requirements for the transmission of the coded speech to the speech recognition engine 120 over a wireless link. The lossy coding is optimized to preserve only the components of the speech signal required for optimal recognition. Further, the lossy compression algorithms that may be used are designed to prevent even momentary gaps in the signal stream, which can cause errors in the speech recognition engine. The digitized speech may be buffered in the coder and the coder may adapt the output data rate to optimize the use of the available bandwidth. The use of the adaptive speech coder is particularly advantageous when a band-limited wireless link is used between the coder and the speech recognition engine.

The microphone can be complemented with an analog or digital (i.e., Voice over IP) speech interface. This interface allows a remote user to connect to the system and interact with it in the same manner possible if they were physically present.

In an alternative embodiment, the array microphone can be replaced by a set of physically distributed microphones or headsets worn by the users. The distributed microphones can be placed in different parts of a vehicle, different parts of a room or in different rooms of a building. The distributed microphones can create a three-dimensional array to improve signal to noise ratio. The headset can use a wireless or wired connection.

While the invention is intended to be able to accept most any natural language question or command, ambiguity may be a problem. To assist users formulate concise questions and commands, the system can support a voice query language. The language may be structured to allow a variety of queries and commands with minimal ambiguity. Thus, the voice query language helps users clearly specify the keywords or contexts of the question or command along with the parameters or criteria. The language can provide a grammar to clearly specify the keyword used to determine the context and present a set of one or criteria or parameters. A user asking a question or stating a command in the voice query language may nearly always be guaranteed to receive a response.

The voice query language may be sensitive to the contents of the context stack, wherein a context defines a set of questions that can be activated or deactivated during a conversation. According to one embodiment, each agent may designate one context to be the root context that defines base algorithms that the agent implements. Thus, follow-on questions can be asked using an abbreviated grammar, since key words and criteria can be inherited from the context stack. For example, the user can simply ask about another keyword if the criteria of the question remain constant.

The system 90, may provide built in training capabilities to help users learn the best methods to formulate their questions and commands. The interactive training allows users to audibly or visibly see the machine interpretation of their queries and provides suggestions on how to better structure a query. Using the interactive training, users can quickly become comfortable with the voice query language and, at the same time, learn how to optimize the amount of information required with each step of a dialog.

The output of the speech coder 122 may be fed to the speech recognition engine 120. The speech recognition engine 120 recognizes words and phrases, using information in the context description grammar 112 and passes these to the parser 118 for interpretation. The speech recognition engine 120 may determine the user's identity by voice and name for each utterance. Recognized words and phrases may be tagged with this identity in all further processing. Thus, as multiple users engage in overlapping sessions, the tags added by the speech recognition engine 120 to each utterance allows other components of the system 90 to tie that utterance to the correct user and dialog. The user recognition capability may further be used as a security measure for applications, such as auctions or online shopping, where this is required. Voice characteristics of each user may be contained in the user profile 110.

According to one embodiment of the invention, users may start a dialog with the system 90 when they first address it. This can be done by speaking a generic word ("computer") or addressing a specific name ("Fred"), which may be generally tied to a system personality 108. Once the user starts the dialog, it may be recognized by the speech recognition engine 120, using unique characteristics of the user's speech. At the end of a dialog or to interrupt a dialog, the user may utter a dismissal word ("good bye").

According to another embodiment of the invention, the system 90 may employ a speech recognition engine 124 that gains improved word recognition accuracy using data from context description grammar 112, user profiles 110, and the agents 106, among other components. At the same time, the fuzzy set possibilities or prior probabilities for the words in the context description grammar may be dynamically updated to maximize the probability of correct recognition at each stage of the dialog. The probabilities or possibilities may be dynamically updated based on a number of criteria including the application domain, the questions or commands, contexts, the user profile and preferences, user dialog history, the recognizer dictionary and phrase tables, and word spellings, among other criteria.

For uncommon words or new vocabulary words, the user may be given the option to spell the words. The spelling can be done by saying the names or the letters or using a phonetic alphabet. The phonetic alphabet can be a default one or one of the user's choosing.

Alternatively, when a user submits a word that is not recognized at all or is not correctly recognized by the speech recognition engine 120, then the user may be asked to spell the word. The speech recognition engine 120 determines this condition based on confidence level for the scoring process. The word may be looked up in a dictionary and the pronunciation for the word is added to either the dictionary, the agent 106, or the user's profile 110. The word pronunciation can then be associated with the domain, the question, the context and the user. Through this process, the speech recognition engine learns with time and improves in accuracy. To assist users in spelling words, an individualized phonetic alphabet can be used. Each user can modify the standard phonetic alphabets with words, which they can remember more easily.

Once the words and phrases have been recognized by the speech recognition engine 120, the tokens and user identification may be passed to the parser 118. The parser examines the tokens for the questions or commands, context and criteria. The parser may determine a context for an utterance by applying prior probabilities or fuzzy possibilities to keyword matching, user profile 110, dialog history, and context stack contents. The context of a question or command may determine the domain and, thereby, the domain agent 156, if any, to be invoked. For example, a question with the keywords "temperature" implies a context value of weather for the question. Within a different dialog, the keyword "temperature" can imply a context for a measurement. The parser dynamically receives keyword and associated prior probability or fuzzy possibility updates from the system agent 150 or an already active domain agent 156. Based on these probabilities or possibilities the possible contexts are scored and the top one or few are used for further processing.

The parser 118 uses a scoring system to determine the most likely context or domain for a user's question and/or command. The score is determined from weighing a number of factors including, the user profile 110, the domain agent's data content and previous context. Based on this scoring, the system 90 invokes the correct agent. If the confidence level of the score is not high enough to ensure a reliable response, the system 90 may ask the user to verify whether the question and/or command is correctly understood.

In general, the question that is asked by the system 90 may be phrased to indicate the context of the question including all criteria or parameters. For example, the question can be in the form of: "Did I understand that you want such-and-such?" If the user confirms that the question is correct the system proceeds to produce a response. Otherwise, the user can rephrase the original question, perhaps adding additional information to remove ambiguity, or the system can ask one or more questions to attempt to resolve the ambiguity.

Once the context for the question or command has been determined, the parser 118 can invoke the correct agent 156, 150. To formulate a question or command in the regular grammar used by agents, the parser will preferably determine required and optional values for the criteria or parameters. These criteria may have been explicitly supplied by the user or may need to be inferred. The parser may make use of the criteria handlers 152 supplied by the system agent. The criteria handlers can provide context sensitive procedures for extracting the criteria or parameters from the user's question or command. Some criteria may be determined by executing algorithms in the agent, while others may be determined by applying probabilistic or fuzzy reasoning to tables of possible values. Prior probabilities or fuzzy possibilities and associated values may be received from a number of sources including, for example, the history of the dialog, the user profile 110, and the agent. Based on user responses, the prior probabilities or fuzzy possibilities may be updated as the system learns the desired behavior. For a weather context, examples of criteria include, location, date and time. Other criteria can include command criteria (i.e., yes/no, on/off, pause, stop), and spelling. Special criteria handlers are available from the system agent for processing lists, tables, barge-in commands, long strings of text and system commands.

The criteria handlers 152 can operate iteratively or recursively on the criteria extracted to eliminate ambiguity. This processing may help reduce the ambiguity in the user's question or command. For example, if the user has a place name (or other proper noun) in their utterance the parser 118 can use services of the domain agent 156 to look up tables in the databases 102 for place names or can attempt to determine which word is the proper noun from the syntax of the utterance. In another example, the user asks, "what about flight one hundred and twenty too?" The parser and domain agent use flight information in the database and network information along with context to determine the most plausible interpretation among; flight 100 and flight 20 also, flight 100 and flight 22, flight 122, etc.

Once the context and the criteria are determined, the parser 118 may form the question or command in a standard format or hierarchical data structure used for processing by the agents 150, 156. The parser 118 may fill in all required and some optional tokens for the grammar of the context. Often the tokens must be transformed to values and forms acceptable to the agents. The parser obtains the required transformations from the agents, dialog history or user profile 110. Examples of transformations or substitutions performed by the parser on tokens include: 1) substituting a stock symbol for a company name or abbreviation; 2) substituting a numerical value for a word or words; 3) adding a zip code to an address; and, 4) changing a place or other name to a commonly used standard abbreviation.

The agents 150, 156 may receive a command or question once the parser 118 has placed it in the required standard format. Based on the context, the parser can evoke the correct agent to process the question or command.

Commands can be directed to the system or to an external entity. System commands are generally directed to the system agent 150. Commands for external entities are generally processed by a domain agent 156, which includes the command context and behavior for the external entity.

Specific questions may be generally directed to one of the domain agents 156. The real-time selection of the correct agent allows the invention to dynamically switch contexts. Based on the question, command or context and the parameters or criteria, the domain agent may create one or more queries to one or more local or external information sources. Questions can be objective or subjective in nature. Results for objective questions can often be obtained by structured queries to one or more local or network information sources. Even for objective questions, the system may need to apply probabilistic or fuzzy set analysis to deal with cases of conflicting information or incomplete information. Information to answer subjective questions is generally obtained by one or more ad-hoc queries to local or network data sources, followed by probabilistic or fuzzy set evaluation of the one results to determine a best answer.

Once the domain agent 156 has formulated the one or more queries, they may be sent to local and/or network information sources. The queries may be performed in an asynchronous manner to account for the fact that sources respond at different speeds or may fail to respond at all. Duplicate queries can be sent to different information sources to ensure that at least one source responds with a useful result in a timely manner. Further, if multiple results are received in a timely manner, they can be scored by the system to determine which data is most reliable or appropriate. Examples of data sources accommodated include, HTTP data sources, sources with meta-data in various formats including XML, measurement data from sensors using various formats, device 32 setting parameters, entertainment audio, video and game files including MP3, databases using query languages and structured responses such as SQL, and other data sources.

The local information sources can be stored in one or more system databases 102 or can be on any local data storage such as a set of CDs or DVDs in a player or other local data storage. In other cases, local information can be obtained from vehicle system settings or measurement devices. Network information sources can be connected to, the control and device interfaces 30, the data interfaces 26, the Internet 42 or other network and accessed through a series of plug-ins or adaptors, known as pluggable sources, in the network interface 116. The pluggable sources are capable of executing the protocols and interpreting the data formats for the data sources of interest. The pluggable source provides information scraping forms and procedures for each source to the domain agents 156. If a new type of data source is to be used a new plug-in or adaptor can be added to the appropriate interface.

The domain agent 156 can evaluate the results of the one or more queries as they arrive. The domain agent may score the relevance of the results based on results already received, the context, the criteria, the history of the dialog, the user profile 110 and domain specific information using probabilistic or fuzzy scoring techniques. Part of the dialog history is maintained in a context stack. The weight of each context for the scoring may be based on the relevance of one context to another and the age of the contexts. Other scoring variables can be associated through the context stack. Contexts can also be exclusive, so that previous contexts have no weight in the scoring.

Based on the on-going scoring processes, the domain agent 156 may determine if a single best answer can be extracted. For most questions, the desired result may include a set of tokens that may be found to formulate an answer. Once a value has been found for each of these tokens, the results are ready for presentation to the user. For example, for a question on weather, the tokens can include the date, day of week, predicted high temperature, predicted low temperature, chance of precipitation, expected cloud cover, expected type of precipitation and other tokens. Results processed in this manner may include error messages. For subjective questions, this determination is made by determining a most likely answer or answers, extracted by matching of the results received. If no satisfactory answer can be inferred from the results of the query, the agent can do one of the following:

1. Ask the user for more information, typically through the speech interface, and based on the results obtained formulate new queries. This approach is applied when an irresolvable ambiguity arises in the formulation of a response.
2. Formulate new queries based on the results received from the first set of queries. This approach is typically applied in cases where the responses received do not include all the required information. Information sources to queries can be inferred from the results already obtained (i.e., links in an HTML document or measurements or settings from other devices 32) or from other sources. Using this approach one or more sets of queries and responses can be chained without the need for action by the user.
3. Wait for additional queries to return results.

In any case, the domain agent 156 may continue to make queries and evaluate results until a satisfactory response is constructed. In doing so, the agent can start several overlapping query paths or threads of inquiry, typically mediated by the event manager 100. This technique, combined with the use of asynchronous queries from multiple data sources provides the real-time response performance required for a natural interaction with the user.

The domain agent 156 may apply conditional scraping operations to each query response as it is received. The conditional scraping actions may depend on the context, the criteria, user profile 110, and domain agent coding and data. For each token to be extracted a scraping criteria 152 can be created using the services of the system agent 150. The scraping criteria may use format specific scraping methods including, tables, lists, text, and other methods. One or more scraping criteria can be applied to a page or results set. Once additional results are received, the domain agent can create new scraping criteria to apply to results already acquired. The conditional scarping process removes extraneous information, such as graphics, which need not be further processed or stored, improving system performance.

Specific commands are generally directed to one of the domain agents 156. The real-time selection of the correct agent allows the invention to dynamically switch contexts. Command oriented domain agents 156 evaluate the command and the state of vehicle systems, system capabilities, and measurements to determine if the command can be executed at all or if doing so will exceed operating or safety limits. If the command is ambiguous or cannot be executed for some other reason, the system may ask the user for more information or may suggest what the problem is and a likely approach to the solution. The domain agent may format the command for the specific device 32 and control and device interface 30. This formatting may involve variable substitution, inference of missing values and other formatting. Variable substitution and inference depends on the command context, the user profile 110, command history, state of vehicle systems and measured values, and other factors. A complex command can result in more atomic commands being sent to multiple devices, perhaps in a sequence. The sequence and nature of subsequent commands may depend on the previous commands, results of pervious commands, device settings and other measurements. As a command is executed, measurements are made and results collected to determine if the execution was correct and the desired state or states were reached.

Once the domain agent 156 has created a satisfactory response to a question, or to a command, the agent may format that response for presentation. Typically, the domain agent can format the response into the markup format used by the text to speech engine 124. The domain agent may format the result presentation using available format templates and based on the context, the criteria, and the user profile 110. The domain agent may perform variable substitutions and transformations to produce a response best understood and most natural to the user. The domain agent may vary the order of presentation of tokens and the exact terminology used to create a more natural response to the user. The domain agent may also select the presentation personality 108 to be used.

For both command and query responses, the domain agent 156 may select the presentation template, determine order of presentation for tokens and determine variable substitutions and transformations using probabilistic or fuzzy set decision methods. The template used to form the presentation can be from the domain agent itself or from the user profile 110. The user profile can completely specify the presentation format or can be used to select and then modify an existing presentation format. Selection and formatting of presentation template can also depend on the presentation personality 108. At the same time, the characteristics of the personality used for the response are dynamically determined using probabilities or fuzzy possibilities derived from the context, the criteria, the domain agent itself and the user profile 110.

The domain agent 156 may apply a number of transformations to the tokens before presentation to the user. These variable substitutions and transformations may be derived from a number of sources including, domain information carried by the agent, the context, the token values, the criteria, the personality 108 to be used, and the user profile 110. Examples of variable substitutions and transformations include: 1) substitution of words for numbers; 2) substitution of names for acronyms or symbols (i.e., trading symbols); 3) use of formatting information derived from the information sources (i.e., HTML tags); 4) nature of the response including, text, long text, list, table; 5) possible missing information or errors; 6) units for measurement (i.e., English or metric); and, 7) preferred terminology from the user profile or presentation personality 108.

The invention may provide special purpose presentation capabilities for long text strings, tables, lists and other large results sets. Domain agents 156 may use special formatting templates for such results. The system agent 150 can provide special criteria handlers 152 for presentation and user commands for large results sets. The presentation templates used by the domain agents for large results sets typically include methods for summarizing the results and then allowing the user to query the result in more detail. For example, initially only short summaries, such as headlines or key numbers, are presented. The user can then query the results set further. The criteria handlers provide users with the capability to browse large results sets. Commands provided by the criteria handlers for large results sets include, stop, pause, skip, rewind, start, and forward.

Some information, in formats such as video, pictures and graphics, may be best presented in a displayed format. The domain agents 156 apply suitable presentation templates in these cases and present the information through the non-speech interface 114. The system agent 150 provides special criteria handlers 152 for presentation and user commands for display presentation and control.

Although particular embodiments of the invention have been shown and described, it will be understood that it is not intended to limit the invention to the embodiments that are disclosed and it will be obvious to those skilled in the art that various changes and modifications may be made without departing from the spirit and scope of the invention. Thus, the invention is intended to cover alternatives, modifications, and equivalents, which may be included within the spirit and scope of the invention as defined by the claims.

We claim:

1. A system for processing natural language utterances where recognized words of the natural language utterances alone are insufficient to completely determine one or more commands or requests, the system comprising:
   one or more physical processors programmed with one or more computer program instructions which, when executed, cause the one or more physical processors to:
      generate a first context stack associated with a first device, the first context stack comprising context information that corresponds to a plurality of prior utterances;
      synchronize the first context stack with a second context stack associated with a second device such that the context information of the first context stack is updated based on related context information of the second context stack;
      receive a natural language utterance associated with a command or request;
      determine one or more words of the natural language utterance by performing speech recognition on the natural language utterance; and
      determine the command or request based on the one or more words and the updated context information.

2. The system of claim 1, wherein the one or more physical processors are further caused to:
   prompt a user associated with the natural language utterance for one or more of (i) additional information regarding the command or request or (ii) confirmation regarding the command or request; and receive a non-speech input regarding one or more of the additional information or the confirmation in response to the prompt, wherein the command or request is determined further based on the non-speech input.

3. The system of claim 1, wherein the first context stack includes a plurality of context entries, and wherein the one or more physical processors are further caused to:

identify, from among the plurality of context entries, one or more context entries that correspond to the one or more words, wherein the updated context information includes the one or more context entries.

4. The system of claim 3, wherein identifying the one or more context entries comprises:

comparing the plurality of context entries with the one or more words;

generating one or more rank scores for individual context entries of the plurality of context entries based on the comparison; and identifying, from among the plurality of context entries, the one or more context entries based on the one or more rank scores.

5. The system of claim 4, wherein the plurality of context entries are ordered in the first context stack, and wherein the one or more physical processors are further caused to update the ordering of the plurality of context entries in the first context stack based on the one or more rank scores.

6. The system of claim 5, wherein the natural language utterance is associated with a user, and wherein the one or more physical processors are further caused to:

receive a subsequent natural language utterance associated with the user; and determine one or more subsequent words of the subsequent natural language utterance by performing speech recognition on the subsequent natural language utterance;

identify, from among the plurality of context entries, one or more other context entries that correspond to the one or more subsequent words based on the updated ordering; and determine a subsequent command or request based on the one or more subsequent words and the one or more other context entries.

7. The system of claim 3, wherein identifying the one or more context entries comprises identifying, from among the plurality of context entries, the one or more context entries that most closely correspond to the one or more words.

8. The system of claim 3, wherein the one or more physical processors are further caused to:

identify one or more domain agents associated with the one or more context entries, wherein the one or more domain agents are configured to process the command or request; and generate a response to the command or request using the one or more domain agents.

9. The system of claim 8, wherein each of the one or more domain agents comprises domain knowledge associated with a particular domain, the domain knowledge comprising: one or more of (i) a keyword; (ii) a link to an information source; (iii) a list of responses associated with a plurality commands or requests; (iv) a substitution list used to format the plurality of commands or requests; or (v) content including dictionaries, encyclopedias, or almanacs.

10. The system of claim 8, wherein the response comprises an aggregation of one or more responses generated by the one or more domain agents based on the command or request.

11. The system of claim 8, wherein the one or more physical processors are further caused to:

obtain information relating to a license agreement that is associated with at least one of the one or more domain agents;

determine, based on the information related to the license agreement, that use of the at least one of the one or more domain agents to process the command or request is permitted; and use, based on the determination that the use is permitted, the at least one of the one or more domain agents to generate the response.

12. The system of claim 1, wherein the natural language utterance is associated with a user, and wherein the one or more physical processors are further caused to:

obtain one or more of a cognitive model or an environmental model associated with the user, wherein the cognitive model comprises information relating to one or more interactions between the user and the system, and the environmental model comprises information indicative of how noisy an environment surrounding the user is, wherein the one or more words are determined further based on one or more of the cognitive model or the environmental model.

13. The system of claim 1, wherein the natural language utterance is associated with a user, and wherein the one or more physical processors are further caused to:

obtain a first cognitive model that comprises information relating to one or more interactions between the user and the system; and obtain a second cognitive model that comprises information relating to one or more interactions between the system and a plurality of users of the system, wherein the one or more words are determined further based on the first cognitive model and the second cognitive model.

14. A computer-implemented method of processing natural language utterances where recognized words of the natural language utterances alone are insufficient to completely determine one or more commands or requests, the method being implemented by a computer system that includes one or more physical processors executing one or more computer program instructions which, when executed, perform the method, the method comprising:

generating, by the one or more physical processors, a first context stack associated with a first device, the first context stack comprising context information that corresponds to a plurality of prior utterances;

synchronizing the first context stack with a second context stack associated with a second device such that the context information of the first context stack is updated based on related context information of the second context stack;

receiving, at the one or more physical processors, a natural language utterance associated with a command or request;

determining, by the one or more physical processors, one or more words of the natural language utterance by performing speech recognition on the natural language utterance; and determining, by the one or more physical processors, the command or request based on the one or more words and the updated context information.

15. The method of claim 14, further comprising:

prompting, by the one or more physical processors, a user associated with the natural language utterance for one or more of (i) additional information regarding the command or request or (ii) confirmation regarding the command or request; and receiving, at the one or more physical processors, a non-speech input regarding one or more of the additional information or the confirmation in response to the prompt, wherein the command or request is determined further based on the non-speech input.

16. The method of claim 14, wherein the first context stack includes a plurality of context entries, the method further comprising:
   identifying, by the one or more physical processors, from among the plurality of context entries, one or more context entries that correspond to the one or more words, wherein the updated context information includes the one or more context entries.

17. The method of claim 16, wherein identifying the one or more context entries comprises:
   comparing the plurality of context entries with the one or more words;
   generating one or more rank scores for individual context entries of the plurality of context entries based on the comparison; and
   identifying, from among the plurality of context entries, the one or more context entries based on the one or more rank scores.

18. The method of claim 16, further comprising:
   identifying, by the one or more physical processors, one or more domain agents associated with the one or more context entries, wherein the one or more domain agents are configured to process the command or request; and
   generating, by the one or more physical processors, a response to the command or request using the one or more domain agents.

19. The method of claim 14, wherein the natural language utterance is associated with a user, the method further comprising:
   obtaining, by the one or more physical processors, a first cognitive model that comprises information relating to one or more interactions between the user and the system; and
   obtaining, by the one or more physical processors, a second cognitive model that comprises information relating to one or more interactions between the system and a plurality of users of the system,
   wherein the one or more words are determined further based on the first cognitive model and the second cognitive model.

20. A computer-implemented method of processing natural language utterances where recognized words of the natural language utterances alone are insufficient to completely determine one or more commands or requests, the method being implemented by a computer system that includes one or more physical processors executing one or more computer program instructions which, when executed, perform the method, the method comprising:
   generating, by the one or more physical processors, a first context set associated with a first device, the first context set comprising context information that corresponds to a plurality of prior utterances;
   synchronizing the first context set with a second context set associated with a second device such that the context information of the first context set is updated based on related context information of the second context set;
   receiving, at the one or more physical processors, a natural language utterance associated with a command or request;
   determining, by the one or more physical processors, one or more words of the natural language utterance by performing speech recognition on the natural language utterance; and
   determining, by the one or more physical processors, the command or request based on the one or more words and the updated context information.

21. The method of claim 20, further comprising:
   prompting, by the one or more physical processors, a user associated with the natural language utterance for one or more of (i) additional information regarding the command or request or (ii) confirmation regarding the command or request; and
   receiving, at the one or more physical processors, a non-speech input regarding one or more of the additional information or the confirmation in response to the prompt, wherein the command or request is determined further based on the non-speech input.

22. The method of claim 20, wherein the first context set includes a plurality of context entries, the method further comprising:
   identifying, by the one or more physical processors, from among the plurality of context entries, one or more context entries that correspond to the one or more words, wherein the updated context information includes the one or more context entries.

23. The method of claim 22, wherein identifying the one or more context entries comprises identifying, from among the plurality of context entries, the one or more context entries that most closely correspond to the one or more words.

24. The method of claim 22, further comprising:
   identifying, by the one or more physical processors, one or more domain agents associated with the one or more context entries, wherein the one or more domain agents are configured to process the command or request; and
   generating, by the one or more physical processors, a response to the command or request using the one or more domain agents.

25. The method of claim 24, wherein each of the one or more domain agents comprises domain knowledge associated with a particular domain, the domain knowledge comprising: one or more of (i) a keyword; (ii) a link to an information source; (iii) a list of responses associated with a plurality commands or requests; (iv) a substitution list used to format the plurality of commands or requests; or (v) content including dictionaries, encyclopedias, or almanacs.

26. The method of claim 24, wherein the response comprises an aggregation of one or more responses generated by the one or more domain agents based on the command or request.

27. The method of claim 24, further comprising:
   obtaining, by the one or more physical processors, information relating to a license agreement that is associated with at least one of the one or more domain agents;
   determining, by the one or more physical processors, based on the information related to the license agreement, that use of the at least one of the one or more domain agents to process the command or request is permitted; and
   using, by the one or more physical processors, based on the determination that the use is permitted, the at least one of the one or more domain agents to generate the response.

* * * * *